(12) United States Patent
Masuda

(10) Patent No.: US 12,126,771 B2
(45) Date of Patent: Oct. 22, 2024

(54) IMAGE FORMING DEVICE, METHOD FOR PROVIDING NOTIFICATION REGARDING UTILIZATION STATUS OF IMAGE FORMING DEVICE, AND USER TERMINAL

(71) Applicant: SHARP KABUSHIKI KAISHA, Sakai (JP)

(72) Inventor: Akitoshi Masuda, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/241,477

(22) Filed: Sep. 1, 2023

(65) Prior Publication Data

US 2024/0089380 A1    Mar. 14, 2024

(30) Foreign Application Priority Data

Sep. 13, 2022  (JP) ................. 2022-145515

(51) Int. Cl.
*H04N 1/00* (2006.01)

(52) U.S. Cl.
CPC ..... *H04N 1/00079* (2013.01); *H04N 1/00042* (2013.01); *H04N 1/0009* (2013.01); *H04N 1/00204* (2013.01); *H04N 1/00411* (2013.01); *H04N 1/00477* (2013.01); *H04N 1/00474* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 2002/0015599 A1 | 2/2002 | Takuwa et al. | |
| 2010/0177345 A1* | 7/2010 | Watanabe | G06F 3/126 358/1.15 |
| 2017/0155793 A1* | 6/2017 | Masumoto | G06F 3/1288 |

FOREIGN PATENT DOCUMENTS

JP     2001-268295 A     9/2001

* cited by examiner

*Primary Examiner* — Thomas D Lee
(74) *Attorney, Agent, or Firm* — ScienBiziP, P.C.

(57) ABSTRACT

An image forming device includes a communicator, an image former, and a controller and when the communicator receives a remote access request from the user terminal, the controller determines whether the device is being used by a second user that is different from a first user having sent the remote access request, determines whether a utilization time of the device per use by the second user has exceeded a predetermined threshold value based on a utilization history of the second user when it is determined that the device is being used by the second user, and notifies the user terminal via the communicator that the utilization time of the image forming device per use by the second user has exceeded the threshold value when it is determined that the utilization time of the device per use by the second user has exceeded the threshold value.

6 Claims, 25 Drawing Sheets

IMAGE FORMING DEVICE, METHOD FOR PROVIDING NOTIFICATION REGARDING UTILIZATION STATUS OF IMAGE FORMING DEVICE, AND USER TERMINAL

TECHNICAL FIELD

The present disclosure relates to an image forming device, a method for providing a notification regarding a utilization status of the image forming device, and a user terminal.

BACKGROUND ART

In recent years, working styles involving working at a location other than a regular workplace, such as remote working and teleworking, have become more widespread.

When a worker engaging in such a working style wishes to print data or the like of work documents, the worker may transfer print data to an office printer for printing.

Even when the worker is at the office, print data has conventionally been transferred for printing from a personal computer (PC) of the worker to a printer in the office.

Such a user who uses a device such as a printer at a location away from the location where the user is located is typically called a "remote user".

Here, among the users of a printer, some users may occupy the printer for a relatively short time (light users) and other users may occupy the printer for a long time. Particularly, users who always occupy the printer for a long time may hinder, as "heavy users", utilization of the printer by other users.

In a case where an office printer is occupied by multiple users, remote users wish to know when printing of their own print data can be started.

In regard to such a problem, an image forming device is known in the related art including, so that one job no longer occupies a printer device for a long time, a measurement section that measures an occupancy time of the device by a first job that is an ongoing job; a setting section that sets an upper limit value of the occupancy time of the device for one job, a comparison section that compares the measured occupancy time of the device with the set upper limit value of the occupancy time of the device, and a control section that controls operation of a second job that is different from the first job based on a comparison result of the comparison section.

The control section is known to interrupt operation of the first job and start the operation of the second job when the measured occupancy time of the device exceeds the set upper limit value of the occupancy time of the device.

SUMMARY

Technical Problem

In this manner, the image forming device in the related art is characterized in that a user who has used the image forming device for a long time is identified based on the occupancy time of the user who is using the image forming device, and a reminder notification is provided to the user regarding interruption of the operation of the user's job.

However, the user who uses the image forming device for a long time is not necessarily a consistent heavy user, and may be a user who is not familiar with the operation or may be a user who was entrusted to copy a large number of documents.

Therefore, it is difficult for the remote user who cannot confirm the specific utilization status of an image forming device to know when the remote user can start printing their own documents from only the occupancy times of the users who are using the image forming device.

The present disclosure was made in view of the circumstances as described above, and an object thereof is to provide a highly user-friendly image forming device, a method for providing a notification regarding a utilization status of the image forming device, and a user terminal, by providing an accurate notification regarding the utilization status of the image forming device to a remote user.

Solution to Problem

An image forming device according to the disclosure includes: a communicator that receives a remote access request from a user terminal via a network; an image former that forms an image based on image data; and a controller that controls the communicator and the image former, in which, when the communicator receives a remote access request from the user terminal, the controller determines whether the image forming device is being used by a second user that is different from a first user having sent the remote access request, determines whether a utilization time of the image forming device per use by the second user has exceeded a predetermined threshold value when it is determined that the image forming device is being used by the second user, and notifies the user terminal via the communicator that the utilization time of the image forming device per use by the second user has exceeded the threshold value when it is determined that the utilization time of the image forming device per use by the second user has exceeded the threshold value.

A method for providing a notification regarding a utilization status of an image forming device according to the disclosure includes: a communication step of receiving a remote access request from a user terminal via a network; and an image formation step of forming an image based on image data, in which, in the communication step, when a remote access request is received from the user terminal, it is determined whether the image forming device is being used by a second user that is different from a first user having sent the remote access request, it is determined whether a utilization time of the image forming device per use by the second user has exceeded a predetermined threshold value when it is determined that the image forming device is being used by the second user, and in the communication step, the user terminal is notified that the utilization time of the image forming device per use by the second user has exceeded the threshold value when it is determined that the utilization time of the image forming device per use by the second user has exceeded the threshold value.

A user terminal according to the disclosure includes: a communicator that transmits a remote access request to an image forming device via a network; an operation inputter that receives the remote access request and instruction for the image forming device; a display that displays various types of information to a user; and a controller that controls the communicator, the operation inputter, and the display, in which, when the operation inputter receives a remote access request to the image forming device, the controller inquires via the communicator whether the image forming device is being used by another user that is different from the user, determines whether a utilization time of the image forming device per use by the other user has exceeded a predetermined threshold value based on information received from the image forming device when a response is obtained indicating that the image forming device is being used by the other user that is different from the user, and displays on the display unit a message indicating that the utilization time of the image forming device per use by the other user has exceeded the predetermined threshold value when it is determined that the utilization time of the image forming device per use by the other user has exceeded the predetermined threshold value.

ADVANTAGE EFFECTS OF INVENTION

According to the disclosure, a highly user-friendly image forming device, a method for providing a notification regarding a utilization status of an image forming device, and a user terminal are realized by providing an accurate notification of the utilization status of the image forming device to a remote user.

DESCRIPTION OF EMBODIMENTS

Figure 1:
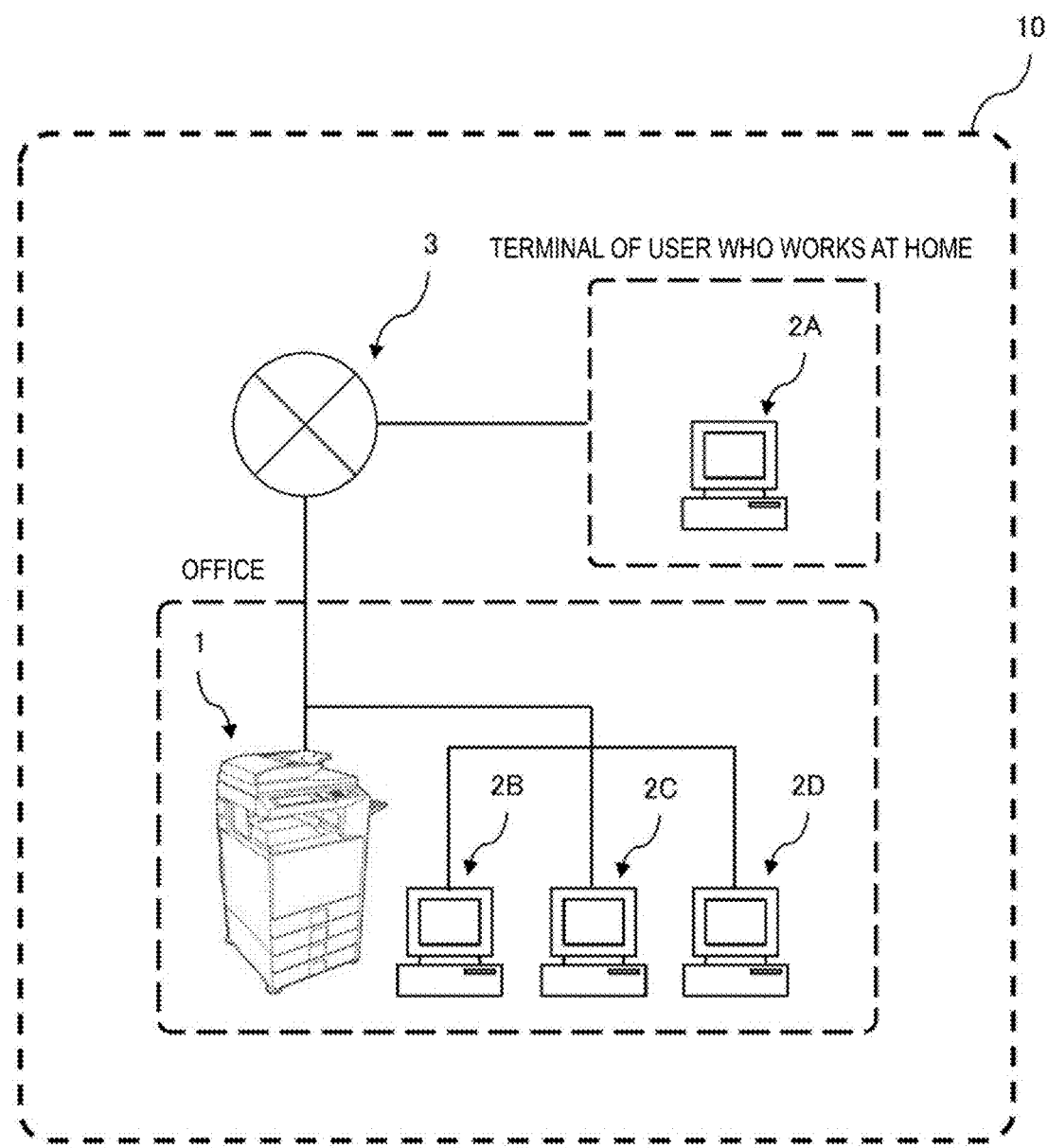
FIG. 1 is an example of a configuration of an image forming system of the disclosure.

In the disclosure, an "image forming device" is a device that forms and outputs an image, such as a copy machine or a multi-function machine having a copier function such as a printer using an electrophotographic scheme for forming an image with toner, or a multifunctional peripheral (MFP) including functions other than copying.

A "user terminal" is not limited to a personal computer (PC) and may be a mobile information terminal such as a smartphone and a tablet terminal, an electronic board, an information display, or the like.

Preferred aspects of the disclosure will be described.

An image forming device according to the disclosure may further include a storage that holds a utilization history of each user, and the controller may determine whether a utilization time of the image forming device has exceeded a predetermined threshold value based on a utilization history of the second user when it is determined that the image forming device is being used by the second user.

In this manner, it is possible to realize a highly user-friendly image forming device determining whether the user who is occupying the image forming device (second user) is a heavy user (a user whose utilization time of the image forming device has exceeded the predetermined threshold value) and providing an accurate notification of the utilization status of the image forming device to a remote user.

The image forming device according to the disclosure may further include a storage that holds a utilization history of each user, and the controller may calculate an expected utilization time of the second user based on a utilization history of the second user and an operating status of the image former and provide a notification of the expected utilization time to the user terminal via the communicator when it is determined that the image forming device is being used by the second user.

In this manner, it is possible to realize a highly user-friendly image forming device by providing a notification of the expected utilization time of a heavy user who is occupying the image forming device and providing an accurate notification regarding the utilization status of the image forming device to the remote user.

The image forming device according to the disclosure may further include a display that displays various types of information for the user, and the controller may cause the display to display a warning message to the second user when the utilization time of the image forming device per use by the second user has exceeded the expected utilization time.

In this manner, it is possible to realize a highly user-friendly image forming device by displaying the warning message and providing an accurate notification regarding the utilization status of the image forming device to the remote user when the occupancy time of the heavy user who is occupying the image forming device has exceeded the expected utilization time.

Instead of the expected utilization time of the heavy user, an average utilization time of each user may be calculated, and the warning message may be displayed when the occupancy time of the heavy user who is occupying the image forming device has exceeded the average utilization time.

The image forming device according to the disclosure may further include a display that displays various types of information to the user, and the controller may cause the display to display a message indicating that the communicator has received a reminder notification for the second user from the user terminal when it is determined that the image forming device is being used by the second user and the utilization time of the image forming device has exceeded the predetermined threshold value, and when the communicator has received the reminder notification for the second user from the user terminal.

In this manner, it is possible to realize a highly user-friendly image forming device by displaying the message of the reminder notification from the user terminal to the heavy user who is occupying the image forming device, and providing an accurate notification regarding the utilization status of the image forming device to the remote user.

Hereinafter, the disclosure will be described in further detail using the drawings. Note that the following description is in all aspects illustrative and it should not be understood as limiting the disclosure.

First Embodiment

A schematic configuration of an image forming system 10 including a digital multi-function machine 1 being an embodiment of an image forming device of the disclosure will be described based on FIG. 1 to FIG. 3.

FIG. 1 is an example of a configuration of the image forming system 10 of the disclosure.

Figure 2:
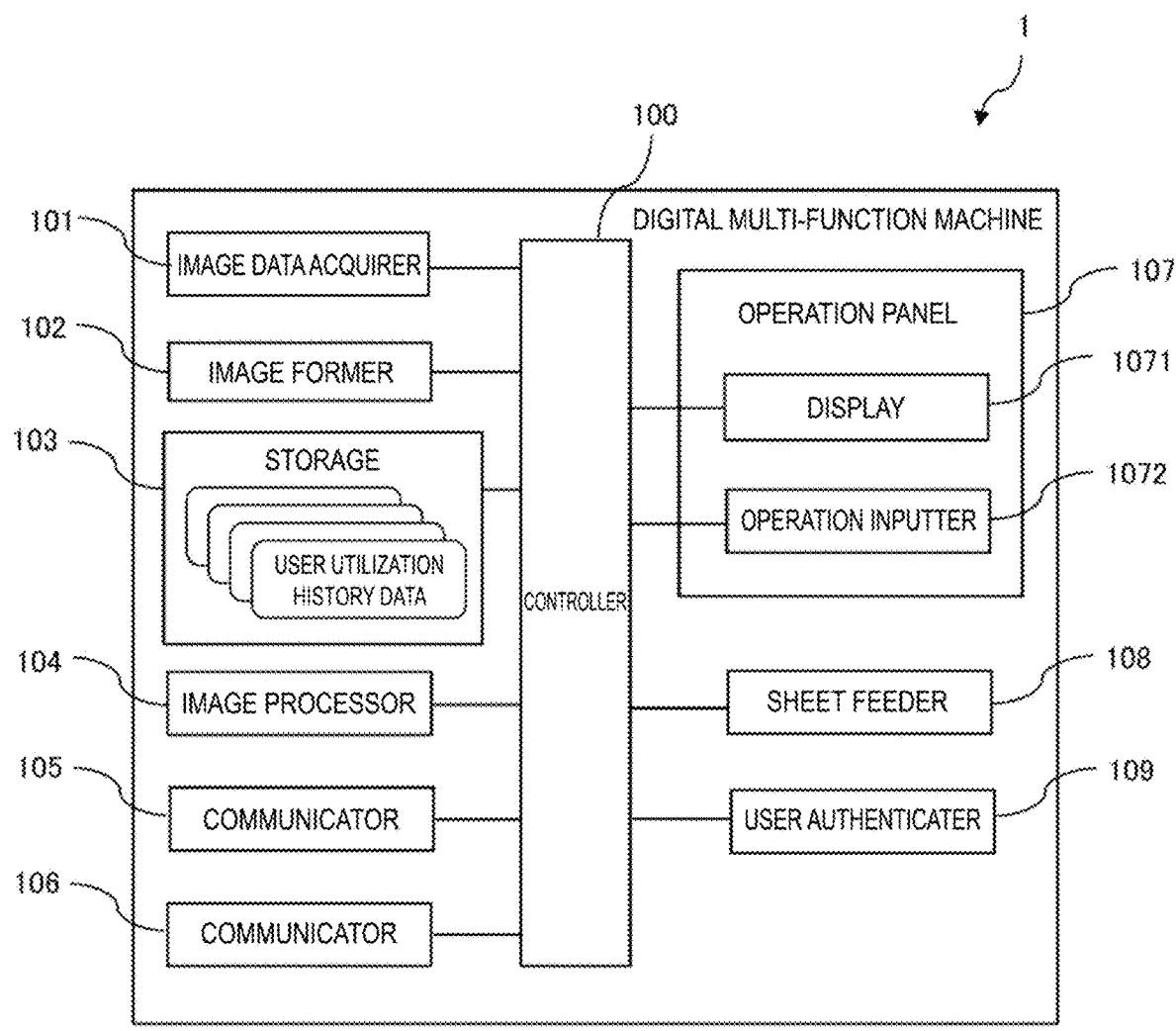
FIG. 2 is a block diagram illustrating a schematic configuration of a digital multi-function machine in FIG. 1.

FIG. 2 is a block diagram illustrating a schematic configuration of the digital multi-function machine 1 in FIG. 1.

As illustrated in FIG. 1, the image forming system 10 of the disclosure includes the digital multi-function machine 1 and user terminals 2A to 2D connected through a network 3.

Note that the user terminals 2A to 2D will be collectively described as user terminals 2 in the following description.

The digital multi-function machine 1 is a device, such as a multi-function machine or a multifunction peripheral (MFP), that performs digital processing on image data and has a copier function, a printer function, a scanner function, and a facsimile function.

Each user terminal 2 transmits image data to the digital multi-function machine 1 via the network 3 and causes the digital multi-function machine 1 to execute a job such as printing.

As illustrated in FIG. 2, the digital multi-function machine 1 includes a controller 100, an image data acquirer 101, an image former 102, a storage 103, an image processor 104, a communicator 105, a timer 106, an operation panel 107, a sheet feeder 108, and a user authenticator 109.

Hereinafter, each component of the digital multi-function machine 1 will be described.

The controller 100 integrally controls the digital multi-function machine 1 and includes a CPU, a RAM, a ROM, various interface circuits, and the like.

The controller 100 performs monitoring and controlling of detection of each sensor and all loads such as a motor, a clutch, and the operation panel 107 in order to control operation of the entire digital multi-function machine 1.

The image data acquirer 101 is a part that detects and reads an original document placed on an original document platform or an original document conveyed from an original document tray to generate image data.

The image data acquirer 101 is a part that acquires image data generated by an information processing device, a facsimile device (not illustrated), and the like external to the user terminal 2 and the like.

The image former 102 is a part that prints and outputs, on a sheet, image data acquired by the image data acquirer 101 and processed by the image processor 104.

The storage 103 is an element or a storage medium that stores information required to realize various functions of the digital multi-function machine 1, a control program, and the like.

For example, a semiconductor device such as a random access memory (RAM) or a read only memory (ROM), or a storage medium such as a hard disk, a flash storage, or a solid state drive (SSD) is used.

The storage 103 stores data required to execute jobs such as utilization history data of each user, information regarding jobs such as printing, and image data.

The storage 103 has a spool region for temporarily saving printing/FAX data.

The storage 103 stores information such as a login name, a password, and the like of each user stored for user authentication.

Note that the program and the data may be held in different devices, for example, the region for holding data includes a hard disk drive and the region for holding the program includes a flash storage.

The image processor 104 is a part that converts image data input from the image data acquirer 101 into an appropriate electrical signal and performs processing such as enlargement or shrinking for appropriate outputting.

The communicator 105 is a part that performs communication with the external user terminal 2 via the network 3 and acquires a command for a job such as printing, original document image data, and the like.

The communicator 105 is a part that performs communication with external devices such as the user terminals 2, servers, other image forming devices, mobile information terminals, information processing devices, and facsimile devices, and transmits and receives various types of information such as emails and faxes to and from these external devices.

The timer 106 is a part that measures and counts time and acquires, for example, a clock time through an incorporated clock or the network 3.

The operation panel 107 includes a display panel including a liquid crystal panel or the like and a capacitance touch panel that is disposed in a superimposed manner on the display panel and detects a position touched with a finger, and includes a display 1071 and an operation inputter 1072.

The display 1071 is a part that displays various types of information.

The display 1071 is a display device such as a monitor or a line display that includes, for example, a CRT display, a liquid crystal display, or an EL display, and is for an operating system and application software displaying electronic data such as processing states.

The controller 100 performs display of the operations and the states of the digital multi-function machine 1 through the display 1071.

The operation inputter 1072 is an interface for operating the digital multi-function machine 1 and is a part that receives a command from the user.

The sheet feeder 108 is a part that conveys, to the image former 102, a sheet stored in a sheet feeding cassette or a manual insertion tray.

The user authenticator 109 is a part that performs authentication regarding whether the user is an authorized user by comparing information such as a login name and a password input from the operation inputter 1072 with corresponding information recorded in advance in the storage 103.

Note that the user authenticator 109 may perform authentication regarding whether the user is an authorized user based on information such as a user ID read from a user's IC card through a card interface, which is not illustrated.

Schematic Configuration of User Terminal 2

Next, a schematic configuration of the user terminal 2 will be described based on FIG. 3.

Figure 3:
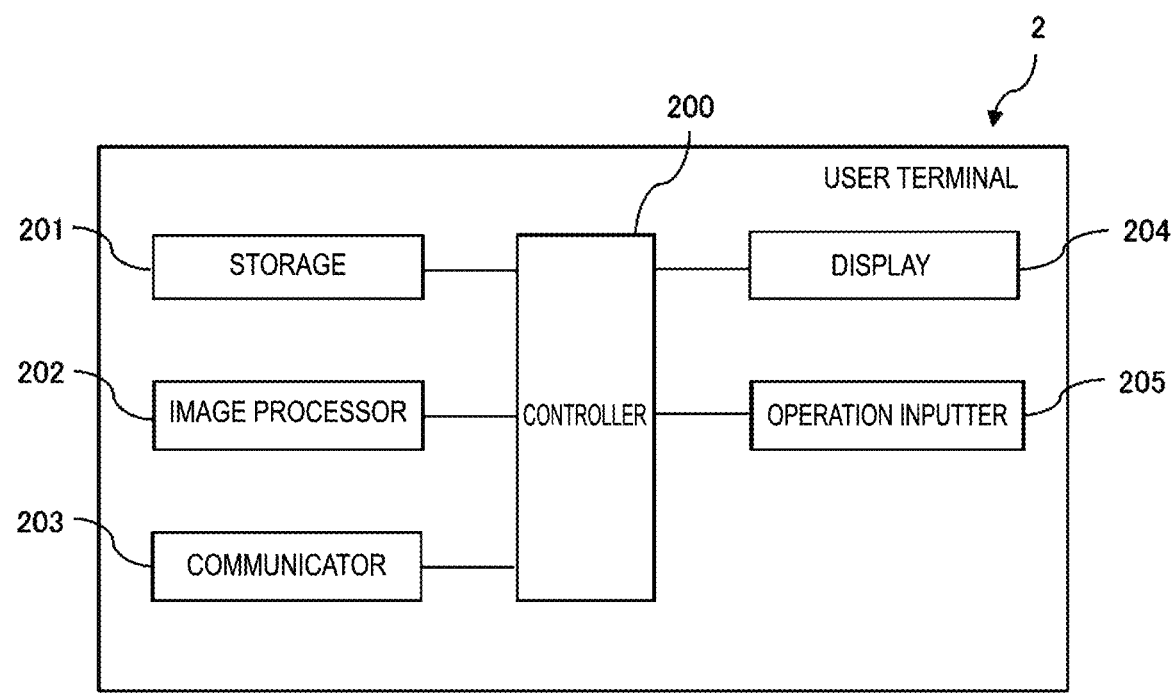
FIG. 3 is a block diagram illustrating a schematic configuration of a user terminal in FIG. 1.

FIG. 3 is a block diagram illustrating a schematic configuration of the user terminal 2 in FIG. 1.

As illustrated in FIG. 3, the user terminal 2 includes a controller 200, a storage 201, an image processor 202, a communicator 203, a display 204, and an operation inputter 205.

Hereinafter, each component of the user terminal 2 will be described.

The controller 200 integrally controls the user terminal 2 and includes a CPU, a RAM, a ROM, various interface circuits and the like.

The controller 200 performs monitoring and control of detection of each sensor and all loads such as the operation inputter 205 in order to control operations of the entire user terminal 2.

The storage 201 is an element or a storage medium that stores information, a control program, and the like required to realize various functions of the user terminal 2.

For example, a semiconductor device such as a RAM or a ROM or a storage medium such as a hard disk, a flash storage, or an SSD is used.

The storage 201 stores information regarding a job such as printing and data required to execute the job such as image data.

Note that the program and the data may be held in different devices, for example, the region for holding data includes a hard disk drive and the region for holding the program includes a flash storage.

The image processor 202 is a part that converts the image data into an appropriate electric signal and performs processing such as enlargement or shrinking for appropriate outputting.

The communicator 203 is a part that performs communication with the external digital multi-function machine 1 and a server via the network 3 and transmits and receives a command for a job such as printing, original document image data, and the like.

Also, the communicator 203 is a part that performs communication with external devices such as image forming devices, mobile information terminals, information processing devices, and facsimile devices and transmits and receives various types of information such as emails and faxes to and from these external devices.

The display 204 is a part that displays various types of information.

The display 204 is a display such as a monitor or a line display that includes, for example, a CRT display, a liquid crystal display, or an EL display and is for an operating system and application software displaying electronic data such as processing states.

The controller 200 performs display of operations and states of the user terminal 2 through the display 204.

The operation inputter 205 is an interface for operating the user terminal 2 and is a part that receives a command from the user.

Note that the display 204 and the operation inputter 205 may include a display panel including a liquid crystal panel or the like and a capacitance touch panel that is disposed in an overlapping manner with the display panel and detects a position touched with a finger.

Processing at Time of Remote Access to Digital Multi-Function Machine 1 in Image Forming System 10 According to First Embodiment of Disclosure Next, processing at the time of a remote access to the digital multi-function machine 1 in the image forming system 10 according to the first embodiment of the disclosure will be described based on FIG. 4 to FIG. 9.

Figure 4:
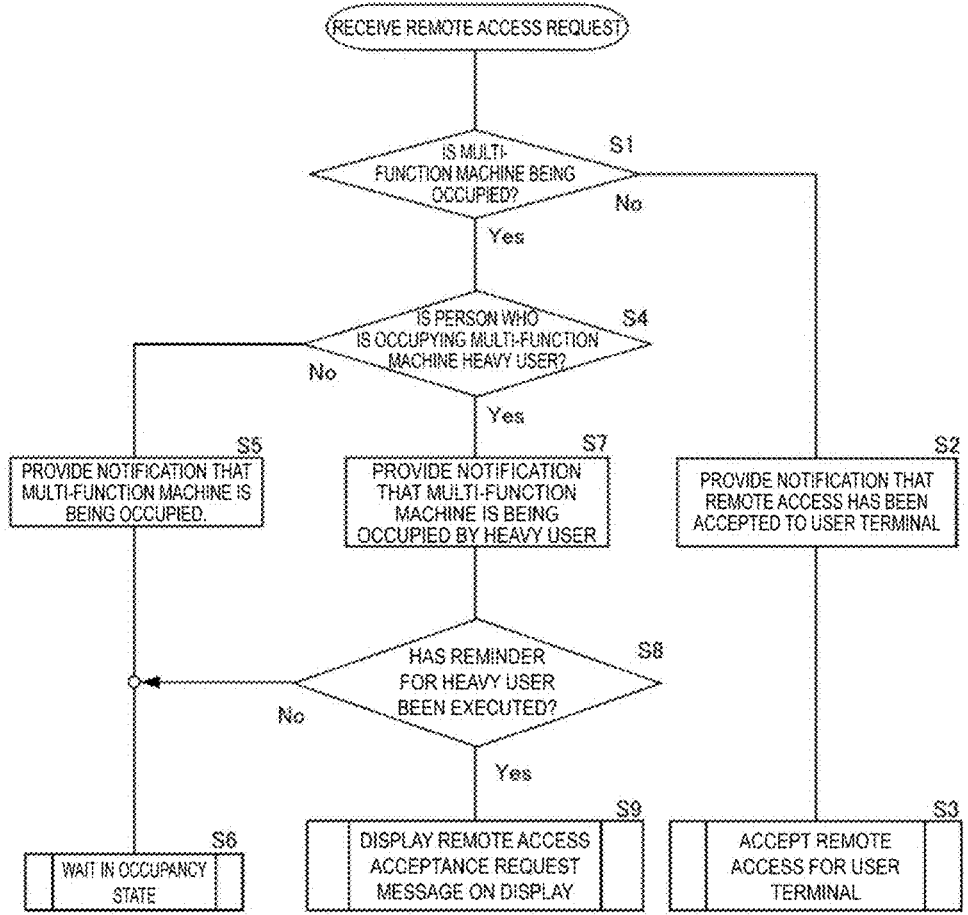
FIG. 4 is a flowchart illustrating processing of receiving a remote access request from the user terminal executed by the digital multi-function machine in the image forming system in FIG. 1.

FIG. 4 is a flowchart illustrating processing of receiving a remote access request from the user terminal 2 that is executed by the digital multi-function machine 1 in the image forming system 10 in FIG. 1.

In FIG. 4, a case where a remote access request to the digital multi-function machine 1 in a company office has been received from the user terminal 2A of a user working at home (first user) or the user terminal 2B, 2C, or 2D in the company is assumed.

In this case, the controller 100 of the digital multi-function machine 1 determines whether the digital multi-function machine 1 is being occupied by another user (second user) in Step S1 in FIG. 4 (Step S1).

Here, "the device is being occupied" means that the device has received a job from a certain user and cannot immediately accept an operation from another user since it takes time to some extent to complete the received job.

Examples thereof include a case where the digital multi-function machine 1 is being used in an occupancy mode as illustrated later in FIG. 5 and a case where the second user is directly or remotely operating the device and the device cannot accept an operation performed by the first user.

Figure 5:
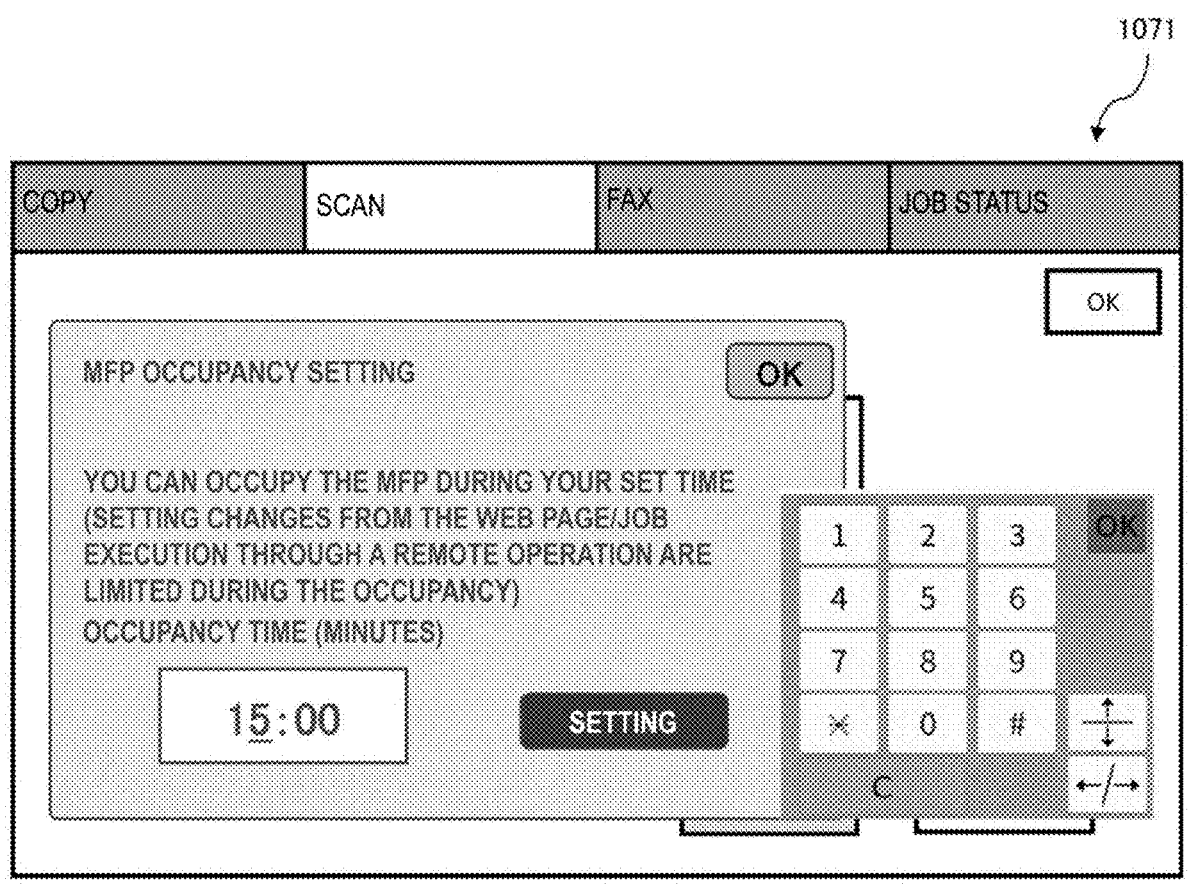
FIG. 5 is an example of occupancy setting of the digital multi-function machine that is executed by the digital multi-function machine in the image forming system in FIG. 1.

FIG. 5 is an example of occupancy setting of the digital multi-function machine 1 that is executed by the digital multi-function machine 1 in the image forming system 10 in FIG. 1.

The user of the digital multi-function machine 1 can performing setting of using the digital multi-function machine 1 in the occupancy mode in "MFP occupancy setting" as illustrated in FIG. 5.

In the example in FIG. 5, the message "You can occupy the MFP during your set time (setting change from the web page/job execution through a remote operation are limited during the occupancy)" is displayed, and the user can set the occupancy time to "15:00" or the like.

In a case where the user presses the "OK" button after performing such setting, the user can use the digital multi-function machine 1 in the occupancy mode.

Note that the controller 100 may determine that the user is occupying the digital multi-function machine 1 in a case where a login time of the user during which the user logs in the digital multi-function machine 1, an operation time of the operation inputter 1062, or a processing time of the user's printing job has continued for a time that is equal to or greater than a predetermined time length.

In a case where the digital multi-function machine 1 is not being occupied by another user (in a case of No in the determination in Step S1), the controller 100 provides a notification that the remote access has been accepted to the user terminal 2A via the communicator 105 in Step S2 (Step S2).

In the subsequent Step S3, the controller 100 accepts a remote access to the digital multi-function machine 1 for the user terminal 2 (Step S3).

On the other hand, in a case where the digital multi-function machine 1 is being occupied by another user (in a case of Yes in the determination in Step S1), the controller 100 determines whether the user who is occupying the digital multi-function machine 1 is a heavy user in Step S4 (Step S4).

Here, whether the occupying user is a heavy user is determined based on a utilization history of each user that has logged in the digital multi-function machine 1.

For example, an average utilization time of the occupying user is calculated from the utilization history of the occupying user, and in a case where the digital multi-function machine 1 has been occupied by the occupying user for a time that is equal to or greater than the predetermined threshold value, it is determined that the occupying user is a heavy user.

It may be determined that the occupying user is a heavy user as long as the utilization time is equal to or greater than the predetermined threshold value even in a case where the occupying user has used the digital multi-function machine 1 only once in the past.

In a case where an average utilization time of the occupying user in the past is ranked higher than an average utilization time of each user in the past (for example, in a case where the occupying user is ranked within top five persons out of one hundred persons), it may be determined that the occupying user is a heavy user.

In a case where the user who is occupying the digital multi-function machine 1 is not a heavy user (in a case of No in the determination in Step S4), the controller 100 provides a notification that the digital multi-function machine 1 is being occupied by another user to the user terminal 2 via the communicator 105 in Step S5 (Step S5).

In the subsequent Step S6, the controller 100 causes the digital multi-function machine 1 to wait in an occupied state (Step S6).

On the other hand, in a case where the user who is occupying the digital multi-function machine 1 is a heavy user (in a case of Yes in the determination in Step S4), the controller 100 provides a notification that the digital multi-function machine 1 is being occupied by another heavy user to the user terminal 2 via the communicator 105 in Step S7 (Step S7).

In the subsequent Step S8, the controller 100 determines whether a reminder for the heavy user has been executed (Step S8).

In a case where the reminder for the heavy user has been executed (in a case of Yes in the determination in Step S8), the controller 100 causes the display 1071 to display a remote access acceptance request message in Step S9 (Step S9).

On the other hand, in a case where the reminder for the heavy user has not been executed (in a case of No in the determination in Step S8), the controller 100 causes the digital multi-function machine 1 to wait in the occupied state in Step S6 (Step S6).

Figure 6:
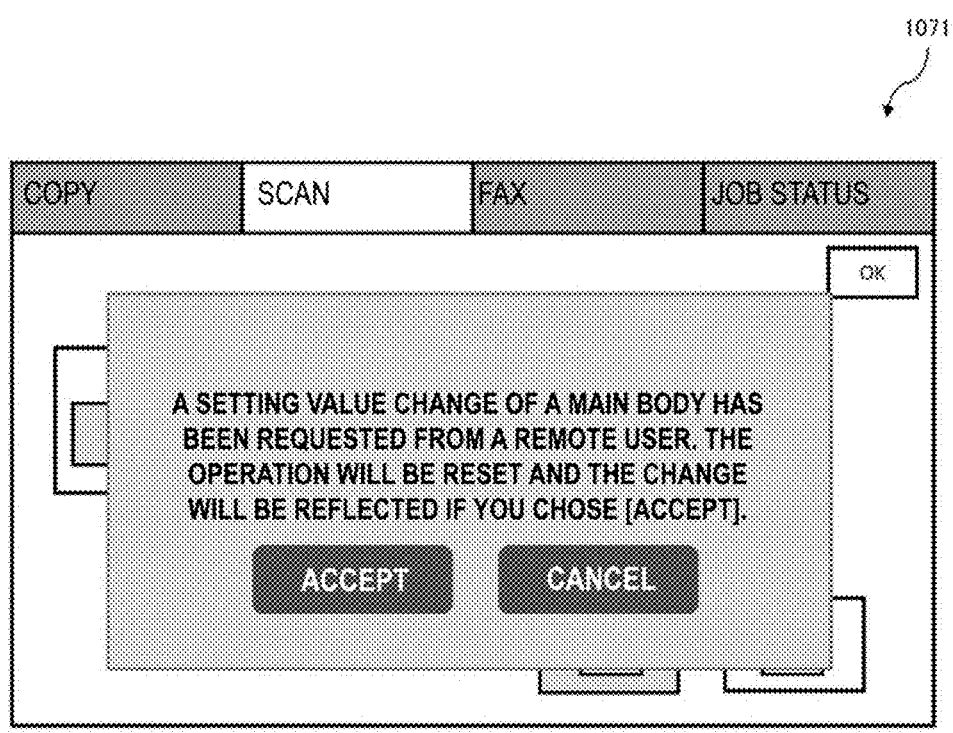
FIG. 6 is an example of a remote access acceptance request message from the user terminal that is displayed on the digital multi-function machine in the image forming system in FIG. 1.

FIG. 6 is an example of a remote access acceptance request message from the user terminal 2 that is displayed for the digital multi-function machine 1 in the image forming system 10 in FIG. 1.

In the example in FIG. 6, "Accept" and "Cancel" buttons are displayed along with a message "A setting value change of a main body has been requested from a remote user. The operation will be reset and the change will be reflected if you chose [Accept]" on the display 1071.

Figure 7:
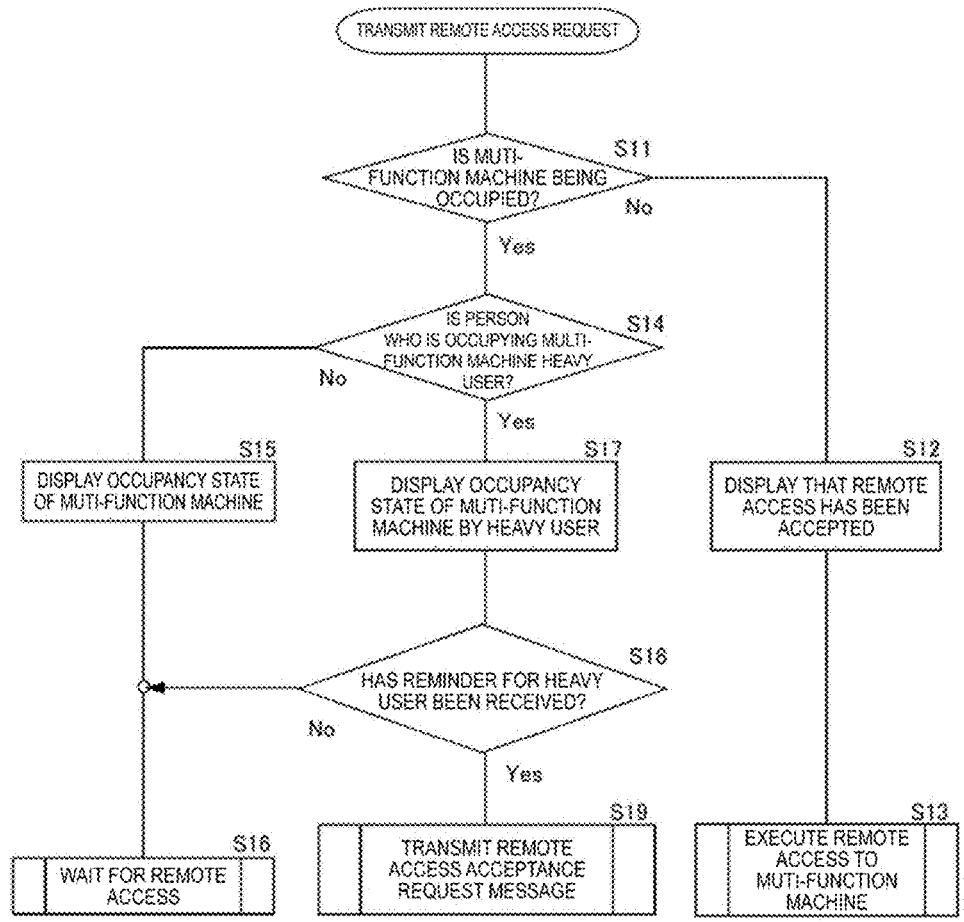
FIG. 7 is a flowchart illustrating processing of transmitting a remote access request to the digital multi-function machine that is executed by the user terminal in the image forming system in FIG. 1.

FIG. 7 is a flowchart illustrating processing of transmitting a remote access request to the digital multi-function machine 1 that is executed by the user terminal 2 in the image forming system 10 in FIG. 1.

In FIG. 7, a case where a remote access request to the digital multi-function machine 1 in a company office has been transmitted from the user terminal 2A of the user who is working at home or the user terminal 2B, 2C, or 2D in the company is assumed.

In this case, the controller 200 of the user terminal 2 inquires whether the digital multi-function machine 1 is being used by another user to the digital multi-function machine 1 via the communicator 203 and determines whether or not the digital multi-function machine 1 is being occupied by another user based on response contents (information received from the image forming device) from the digital multi-function machine 1 in Step S11 in FIG. 7 (Step S11).

In a case where it is determined that the digital multi-function machine 1 is not being occupied by another user (in a case of No in the determination in Step S11), the controller 200 causes the display 204 to display the fact that the remote access has been accepted in Step S12 (Step S12).

In the subsequent step S13, the controller 200 executes a remote access to the digital multi-function machine 1 (Step S13).

On the other hand, in a case where it is determined that the digital multi-function machine 1 is being occupied by another user (in a case of Yes in the determination in Step S11), the controller 200 determines whether the user who is occupying the digital multi-function machine 1 is a heavy user in Step S14 (Step S14).

In a case where the user who is occupying the digital multi-function machine 1 is not a heavy user (in a case of No in the determination in Step S14), the controller 200 causes the display 204 to display that the digital multi-function machine 1 is being occupied by another user in Step S15 (Step S15).

In the subsequent Step S16, the controller 200 causes the digital multi-function machine 1 to wait in the occupied state (Step S16).

On the other hand, in a case where the user who is occupying the digital multi-function machine 1 is a heavy user (in a case of Yes in the determination in Step S14), the controller 200 causes the display 204 to display that the digital multi-function machine 1 is being occupied by another heavy user in Step S17 (Step S17).

Figure 8:
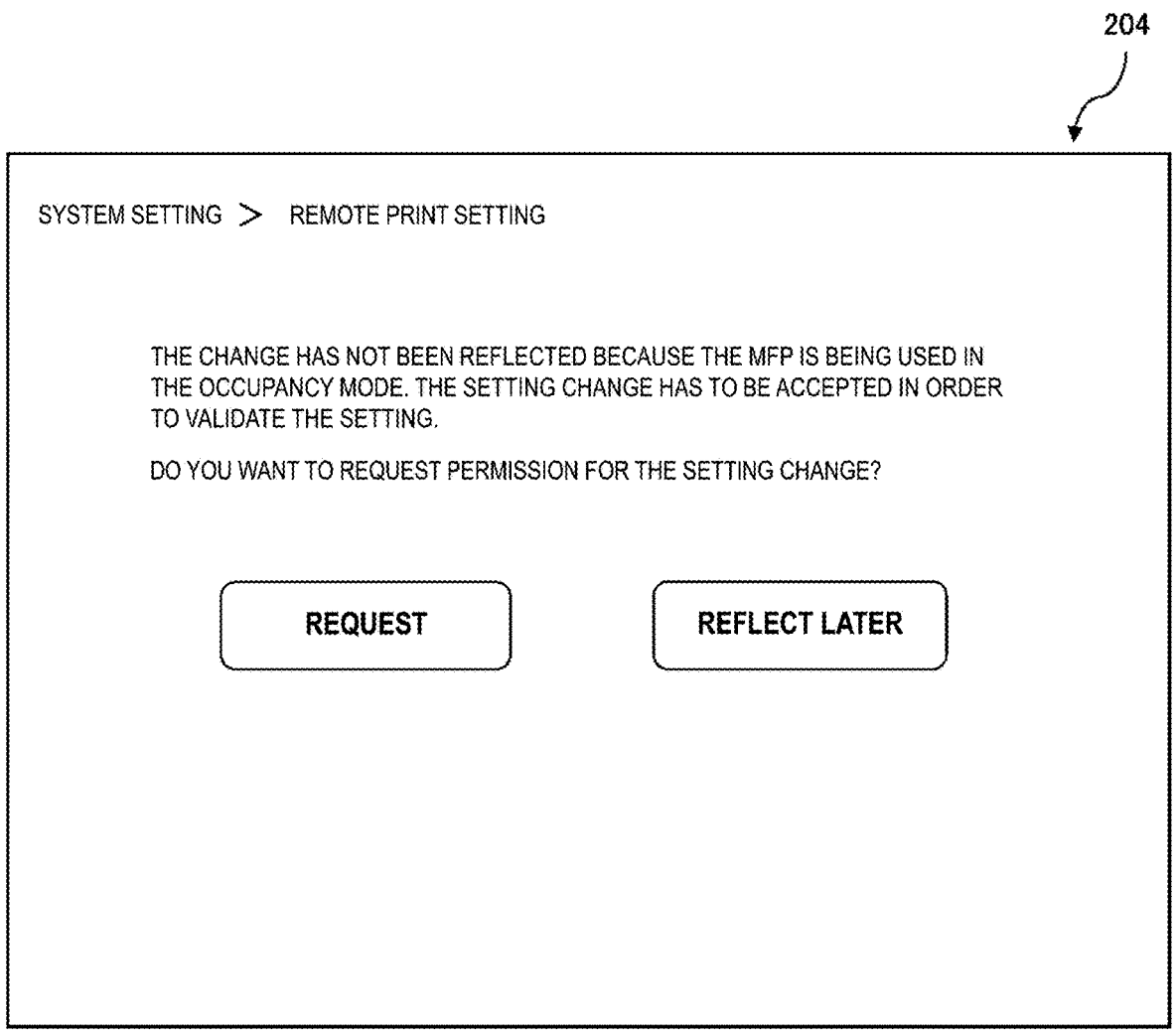
FIG. 8 is an example of a message that is displayed on the user terminal and indicates that the digital multi-function machine is being occupied, in the image forming system in FIG. 1.
Figure 10:
FIG. 10 is an example of a message that is displayed on the user terminal and indicates that an access to the digital multi-function machine has been accepted, in the image forming system in FIG. 1.

FIG. 8 is an example of a message that is displayed on the user terminal 2 and indicates that the digital multi-function machine 1 is being occupied, in the image forming system 10 in FIG. 10.

In the example in FIG. 8, "Request" and "Reflect later" buttons are displayed along with a message "The change has not been reflected because the MFP is being used in the occupancy mode. The setting change has to be accepted in order to validate the setting. Do you want to request permission of the setting change?"

In the subsequent Step S18, the controller 200 determines whether a reminder for the heavy user has been received (Step S18).

In a case where it is determined that the reminder for the heavy user has been received (in a case of Yes in the determination in Step S18), the controller 200 causes the communicator 203 to transmit a remote access acceptance request message in Step S19 (Step S19).

On the other hand, in a case where it is determined that the reminder for the heavy user has not been executed (in a case of No in the determination in Step S18), the controller 100 waits for a remote access to the digital multi-function machine 1 in Step S16 (Step S16).

Figure 9:
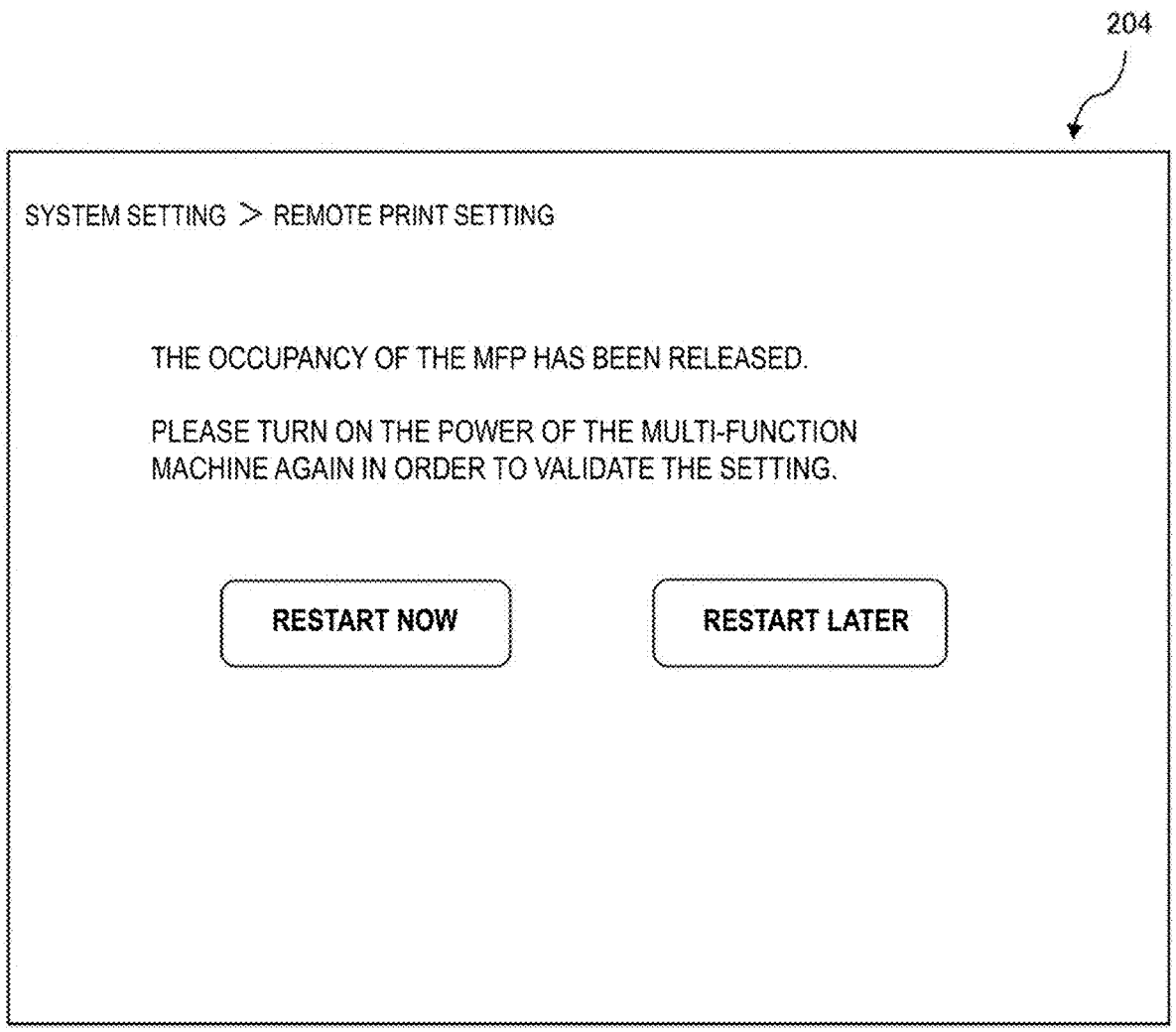
FIG. 9 is an example of a message that is displayed on the user terminal and indicates that the occupancy of the digital multi-function machine has been released, in the image forming system in FIG. 1.

FIG. 9 is an example of a message that is displayed on the user terminal 2 and indicates that the occupancy of the digital multi-function machine 1 has been released, in the image forming system 10 in FIG. 1.

In the example in FIG. 9, "Restart right now" and "Restart later" buttons are displayed along with the message "The occupancy of the MFP has been released. Please turn on the power of the multi-function machine again in order to validate the setting".

FIG. 10 is an example of a message that is displayed on the user terminal 2 and indicates that an access to the digital multi-function machine 1 has been accepted, in the image forming system 10 in FIG. 1.

In the example in FIG. 10, an "OK" button is displayed along with the message "The access to the MFP has been accepted. The limitation of the operation in the remote access mode will be released".

In this manner, it is possible to realize the highly user-friendly image forming system 10 by avoiding unnecessary occupancy of the digital multi-function machine 1 by the users as compared to the related art and reducing a waiting time for the remote users.

Second Embodiment

Processing at Time of Remote Access to Digital Multi-Function Machine 1 in Image Forming System 10 According to Second Embodiment of Disclosure Next, processing at the time of a remote access to a digital multi-function machine 1 in an image forming system 10 according to a second embodiment of the disclosure will be described based on FIG. 11 to FIG. 14.

Since a schematic configuration of the image forming system 10 according to the second embodiment of the disclosure is the same as that in the first embodiment (FIG. 1 to FIG. 3), description thereof will be omitted.

Figure 11:
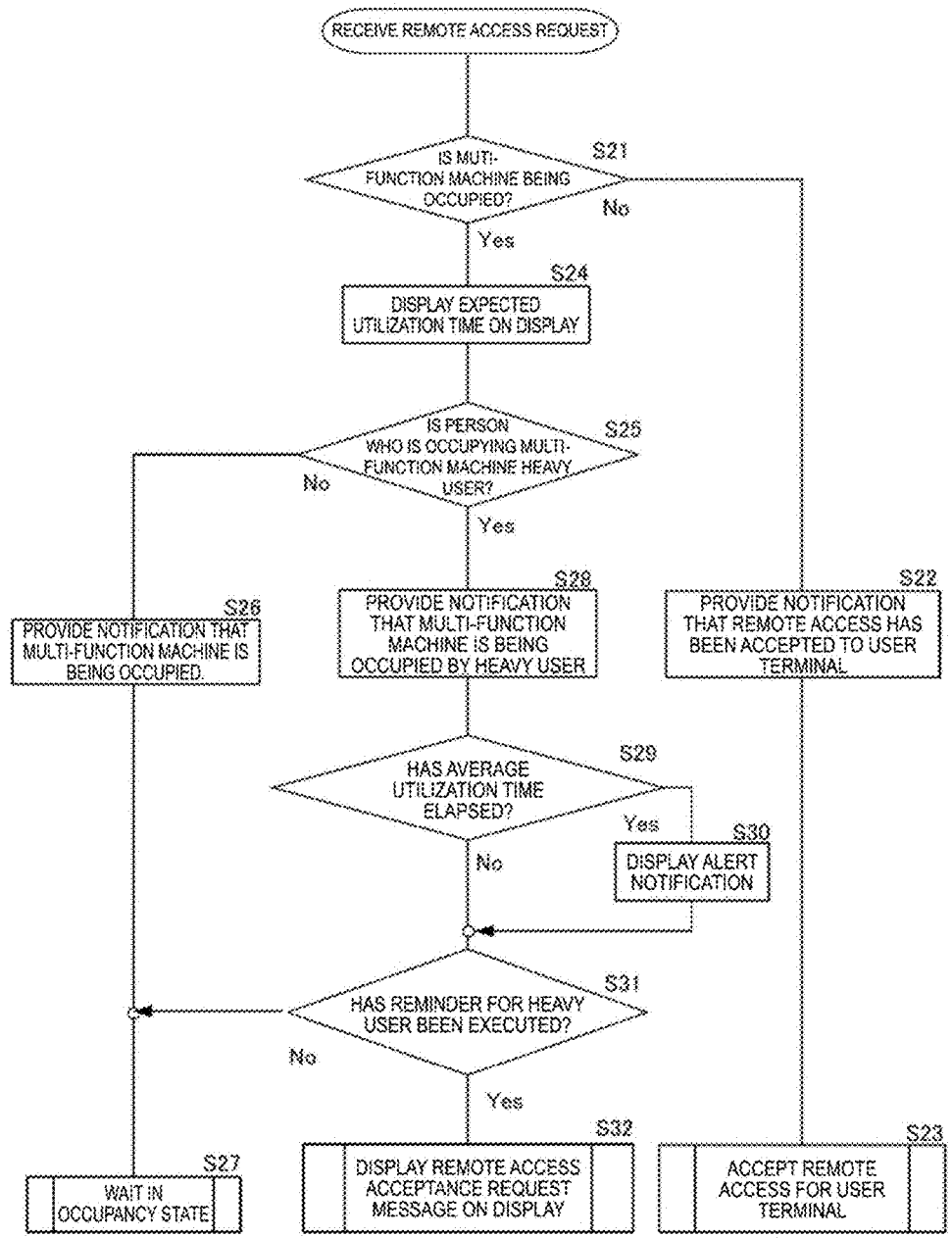
FIG. 11 is a flowchart illustrating processing of receiving a remote access request from a user terminal that is executed by a digital multi-function machine in an image forming system according to a second embodiment of the disclosure.

FIG. 11 is a flowchart illustrating processing of receiving a remote access request from a user terminal 2 that is executed in the digital multi-function machine in the image forming system 10 according to the second embodiment of the disclosure.

Since the processing in Steps S21 to S23, S25 to S28, S31, and S32 in FIG. 11 corresponds to processing in Steps S1 to S9 in FIG. 4 (first embodiment), respectively, description thereof will be omitted.

Here, processing in Steps S24, S29, and S30 in FIG. 11 which are not illustrated in FIG. 4 will be described.

In Step S21 in FIG. 11, in a case where the digital multi-function machine 1 is being occupied by another user (in a case of Yes in the determination in Step S21), a controller 100 of the digital multi-function machine 1 calculates an expected utilization time of the user who is occupying the digital multi-function machine 1 and displays it on the display 1071 based on a utilization history of the user held in the storage 103 in Step S24 (Step S24).

Also, the controller 100 provides a notification that the digital multi-function machine 1 is being occupied by another heavy user to the user terminal 2 via a communicator 105 in Step S28 (Step S28), and determines whether the occupancy time of the heavy user has exceeded an average utilization time of the users in Step S29 (Step S29).

As the average utilization time, an average utilization time of the heavy user themself may be employed instead of the average utilization time of all the past users who have logged in.

Also, an average utilization time in a predefined period may be employed instead of the average utilization time as a whole in the past.

In a case where the occupancy time of the heavy user has exceeded the average utilization time of each user (in a case of Yes in the determination in Step S29), the controller 100 causes the display 1071 to display a warning notification indicating the fact in Step S30 (Step S30).

Subsequently, the controller 100 determines whether a reminder for the heavy user has been executed in Step S31 (Step S31).

On the other hand, in a case where the occupancy time of the heavy user has not exceeded the average utilization time of each user (in a case of No in the determination in Step S29), the controller 100 determines whether the reminder for the heavy user has been executed in Step S31 (Step S31).

Figure 12:
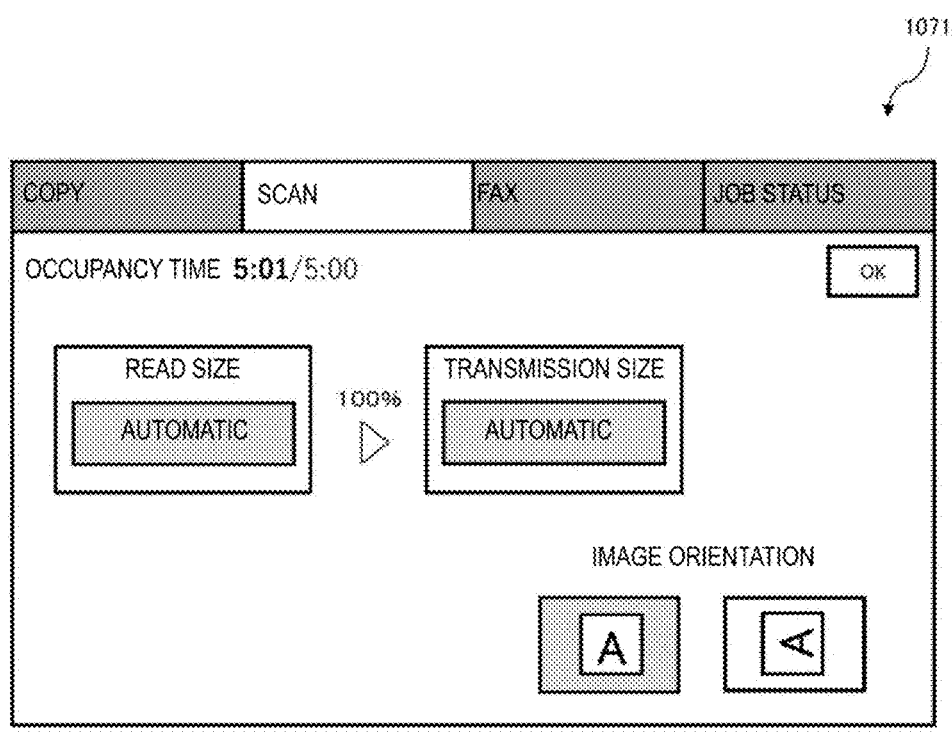
FIG. 12 is an example of a warning notification that is displayed on the digital multi-function machine and indicates that a utilization time of a user who occupies the digital multi-function machine has exceeded an average utilization time of each user, in the image forming system according to the second embodiment of the disclosure.

FIG. 12 is an example of a warning notification that is displayed on the digital multi-function machine 1 and indicates that the utilization time of the user who is occupying the digital multi-function machine 1 has exceeded the average utilization time of each user, in the image forming system 10 according to the second embodiment of the disclosure.

In the example in FIG. 12, the fact that the occupancy time "5:01" has exceeded the average utilization time "5:00" of each user is displayed in a manner as "Occupancy time 5:01/5:00" in the upper bar on the display 1071.

Figure 13:
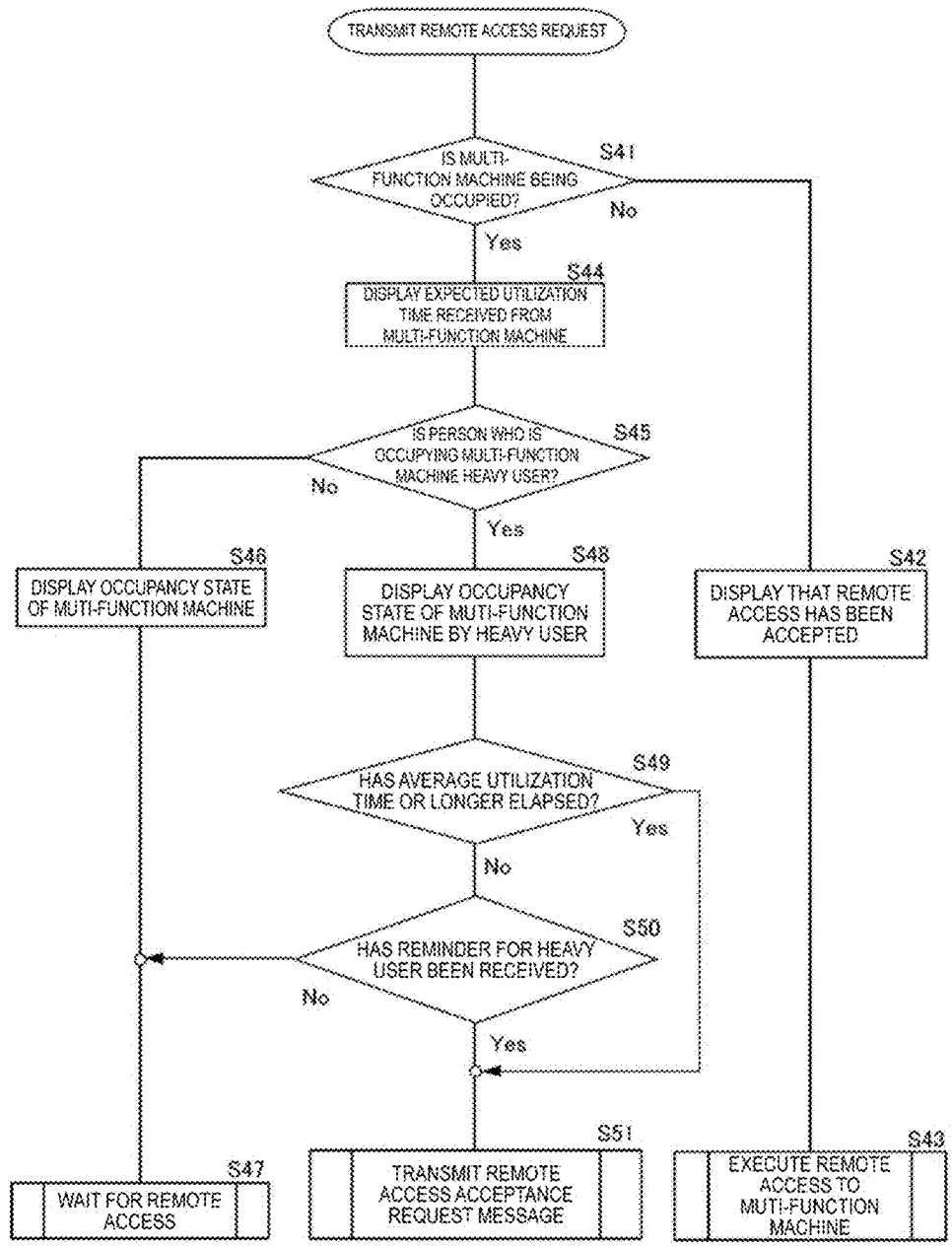
FIG. 13 is a flowchart illustrating processing of transmitting a remote access request to the digital multi-function machine that is executed by the user terminal in the image forming system according to the second embodiment of the disclosure.

FIG. 13 is a flowchart illustrating processing of transmitting a remote access request transmission processing to the digital multi-function machine 1 that is executed by the user terminal 2 in the image forming system 10 in FIG. 1.

Since processing in Steps S41 to S43, S45 to S48, S50, and S51 in FIG. 13 corresponds to the processing in Steps S11 to S19 in FIG. 7 (first embodiment), respectively, description thereof will be omitted.

Here, processing in Steps S44 and S49 in FIG. 13 that has not described in FIG. 7 will be described.

In Step S41 in FIG. 13, in a case where the digital multi-function machine 1 is being occupied by another user (in a case of Yes in the determination in Step S41), a controller 200 of the user terminal 2 causes a display 204 to display an expected utilization time of the user who is occupying the digital multi-function machine 1 that has been received from the digital multi-function machine 1 via a communicator 203 in Step S44 (Step S44).

Figure 14:
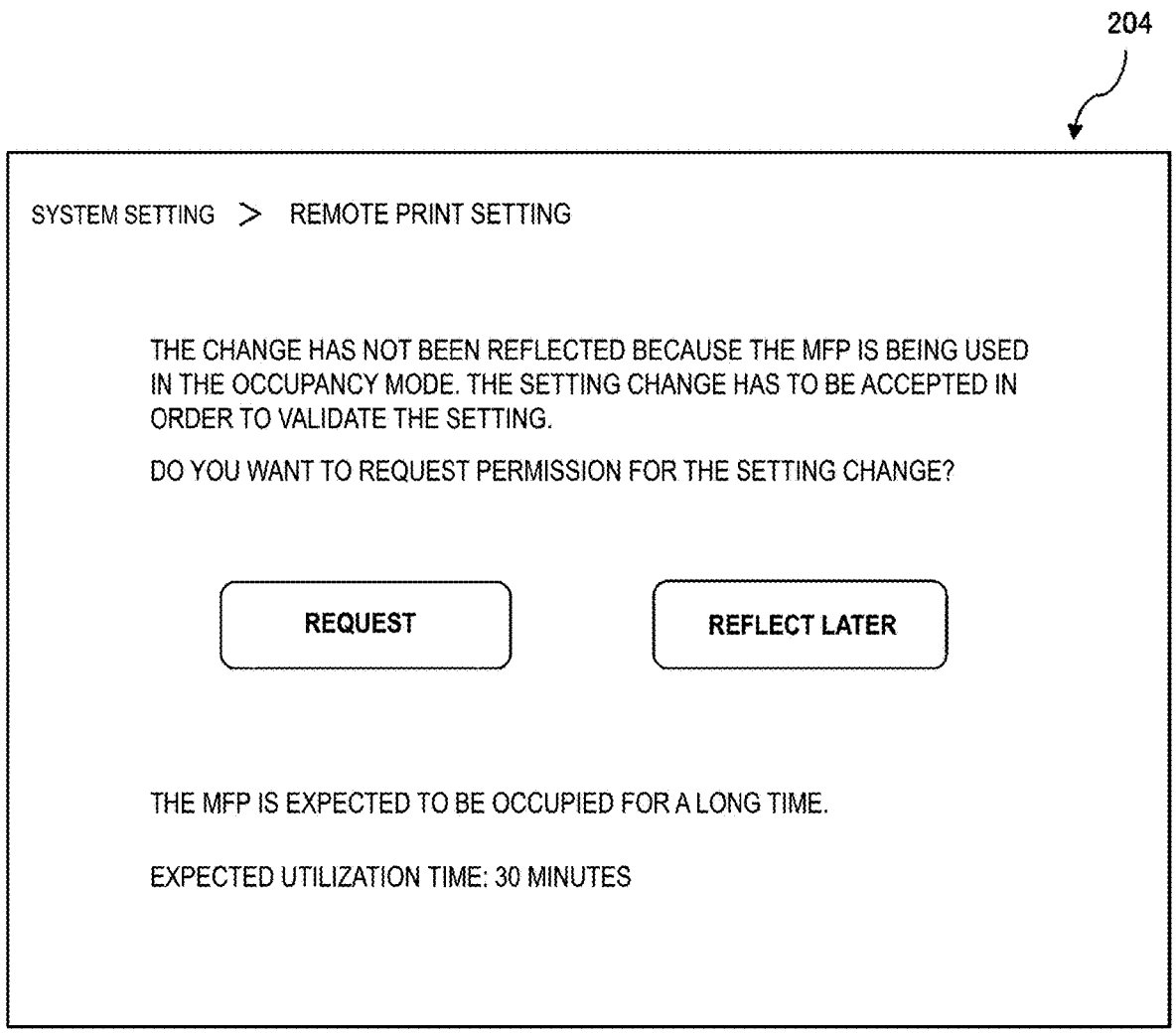
FIG. 14 is an example of a message that is displayed on the user terminal and indicates that the digital multi-function machine is being occupied by a heavy user, in the image forming system according to the second embodiment of the disclosure.

FIG. 14 is an example of a message that is displayed on the user terminal 2 and indicates that the digital multi-function machine 1 is being occupied by a heavy user in the image forming system 10 according to the second embodiment of the disclosure.

In the example in FIG. 14, "Request" and "Reflect later" buttons are displayed along with a message "The change has not been reflected because the MFP is being used in the occupancy mode. The setting change has to be accepted in order to validate the setting. Do you want to request permission of the setting change?".

Also, "The MFP is expected to be occupied for a long time. Expected utilization time: 30 minutes" is displayed below.

Next, the fact that the digital multi-function machine 1 is being occupied by another heavy user is displayed on the display 204 via the communicator 105 in Step S48 in FIG. 13 (Step S48), and the controller 200 then determines whether the occupancy time of the heavy user has exceeded the average utilization time of each user in Step S49 (Step S49).

In a case where the occupancy time of the heavy user has exceeded the average utilization time of each user (in a case of Yes in the determination in Step S49), the controller 200 causes the communicator 203 to transmit a remote access acceptance request message in Step S51 (Step S51).

On the other hand, in a case where the occupancy time of the heavy user has not exceeded the average utilization time of each user (in a case of No in the determination in Step S49), the controller 200 determines whether the reminder for the heavy user has been received in Step S50 (Step S50).

In this manner, it is possible to realize the highly user-friendly image forming system 10 by displaying an expected utilization time in a case where the digital multi-function machine 1 is being occupied by a heavy user and displaying a warning notification in a case where the average utilization time of each user has been exceeded thereby to avoid unnecessary occupancy of the digital multi-function machine 1 by the users and reducing waiting times for the remote users as compared with those in the related art.

Modified Example 1

As a modified example 1 of the second embodiment, the user who is occupying the digital multi-function machine 1 may be allowed to input an occupancy time, and the occupancy time may be displayed as an expected utilization time of the occupying user.

In this manner, it is possible for the remote user not only to know the occupancy time of the occupying user but also to easily determine whether the occupying user is a heavy user based on how long the occupancy time input by the user is.

Modified Example 2

As a modified example 2 of the second embodiment, a utilization history of the user who is occupying the digital multi-function machine 1 can be referred to as a graph or the like in a case where the remote user has predetermined authority.

Figure 15:
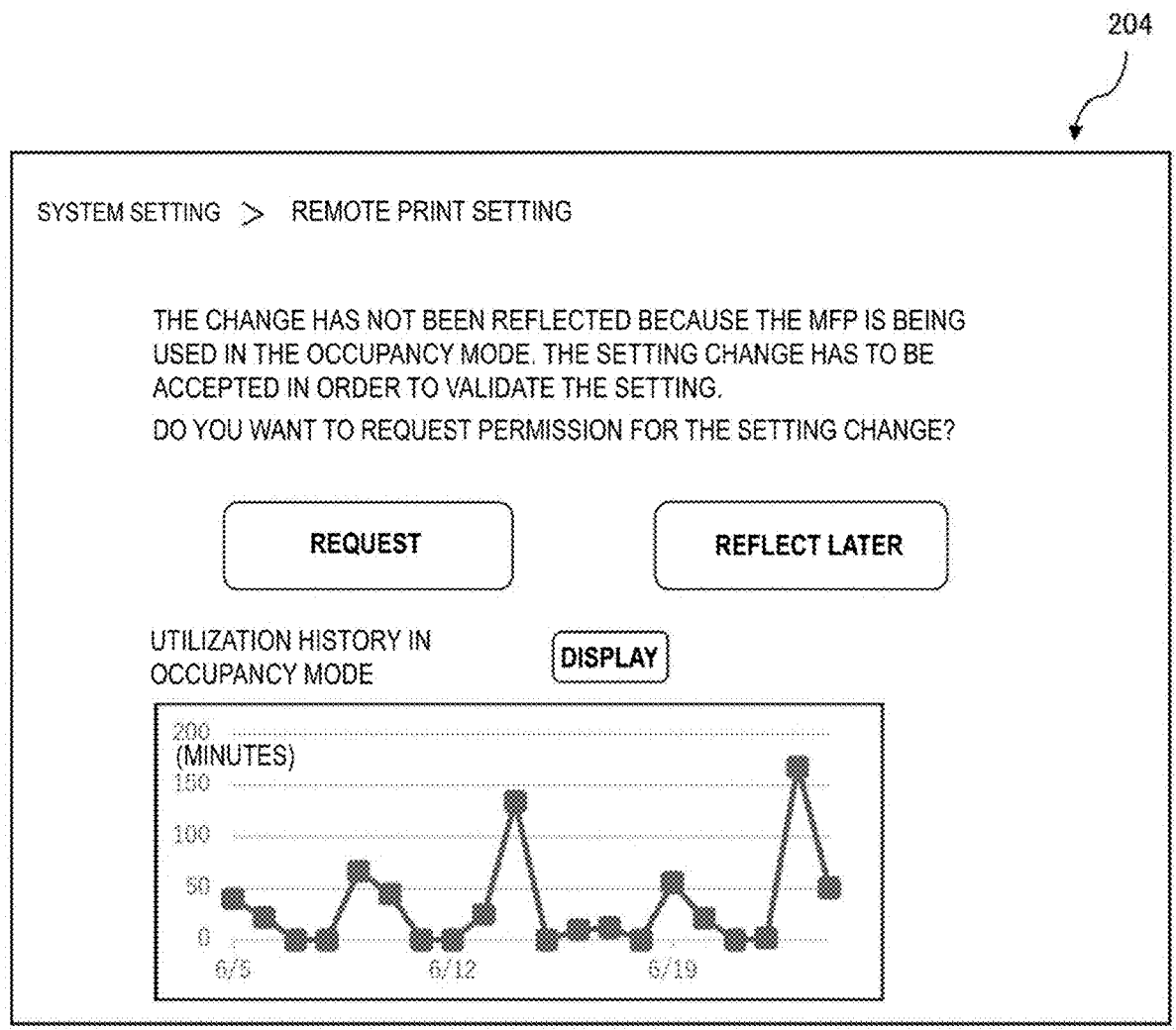
FIG. 15 is an example in which a utilization history of a heavy user is displayed by a message that is displayed on the user terminal and indicates that the digital multi-function machine is being occupied by the heavy user, in the image forming system according to the second embodiment of the disclosure.

FIG. 15 is an example in which the utilization history of the heavy user is represented by a message that is displayed on the user terminal 2 and indicates that the digital multi-function machine 1 is being occupied by the heavy user, in the image forming system 10 according to the second embodiment of the disclosure.

In the example in FIG. 15, once the user presses the "Display" button in "Utilization history in occupancy mode", the utilization history of the heavy user is displayed as a graph.

In this case, the remote user may be able to change the period of the utilization history to be used to calculate the expected utilization time of the occupying user.

In this manner, the remote user having predetermined authority can estimate the expected utilization time by viewing the utilization tendency of the occupying user.

Third Embodiment

Processing at Time of Remote Access to Digital Multi-Function Machine 1 in Image Forming System 10 According to Third Embodiment of Disclosure Next, processing at the time of a remote access to a digital multi-function machine 1 in an image forming system 10 according to a third embodiment of the disclosure will be described based on FIG. 16 to FIG. 18.

Since a schematic configuration of the image forming system 10 according to the third embodiment of the disclosure is the same as that in the first embodiment (FIG. 1 to FIG. 3), description thereof will be omitted.

Figure 16:
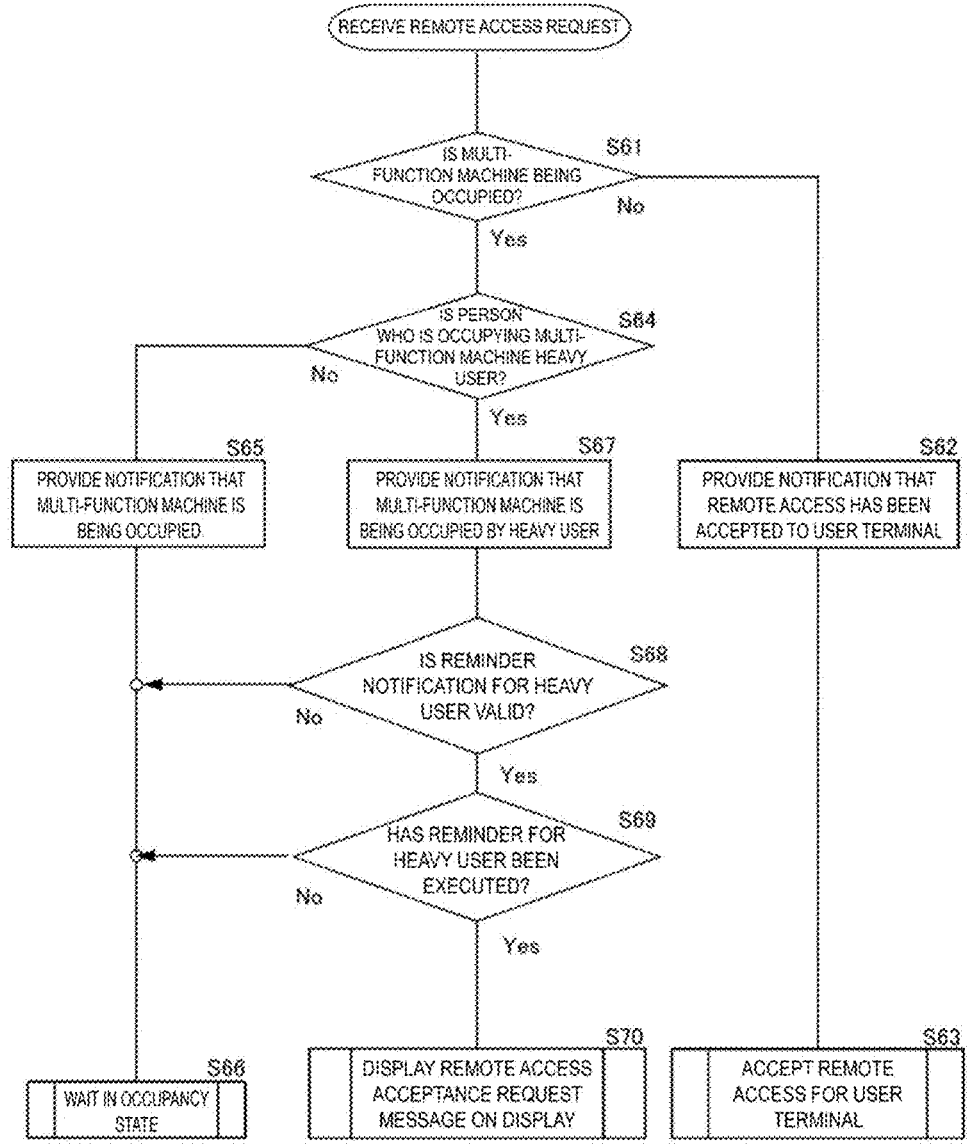
FIG. 16 is a flowchart illustrating processing of receiving a remote access request from a user terminal that is executed by a digital multi-function machine in an image forming system according to a third embodiment of the disclosure.

FIG. 16 is a flowchart illustrating processing of receiving a remote access request from a user terminal 2 that is executed by the digital multi-function machine 1 in the image forming system 10 according to the third embodiment of the disclosure.

Since processing in Steps S61 to S67, S69, and S70 in FIG. 16 corresponds to the processing in Steps S1 to S9 in FIG. 4 (first embodiment), respectively, description thereof will be omitted.

Here, processing in Step S68 in FIG. 16 that has not been described in FIG. 4 will be described.

In Step S67 in FIG. 16, a notification that the digital multi-function machine 1 is being occupied by another heavy user is provided to the user terminal 2 via the communicator 105 in Step S67 in FIG. 16 (Step S67), and the controller 100 then determines whether a reminder notification for the heavy user is valid in the subsequent Step S68 (Step S68).

For example, some users may end up having to become a heavy user because they have to print a large number of documents.

A user who has administrator authority can apply priority setting with which a reminder notification is not provided from any remote user for such a user.

In a case where the reminder notification for the heavy user is valid (in a case of Yes in the determination in Step S68), the controller 100 determines whether the reminder for the heavy user has been executed in Step S69 (Step S69).

On the other hand, in a case where the reminder notification for the heavy user is not valid (in a case of No in the determination in Step S68), the controller 100 causes the digital multi-function machine 1 to wait in an occupied state in Step S66 in (Step S66).

Figure 17:
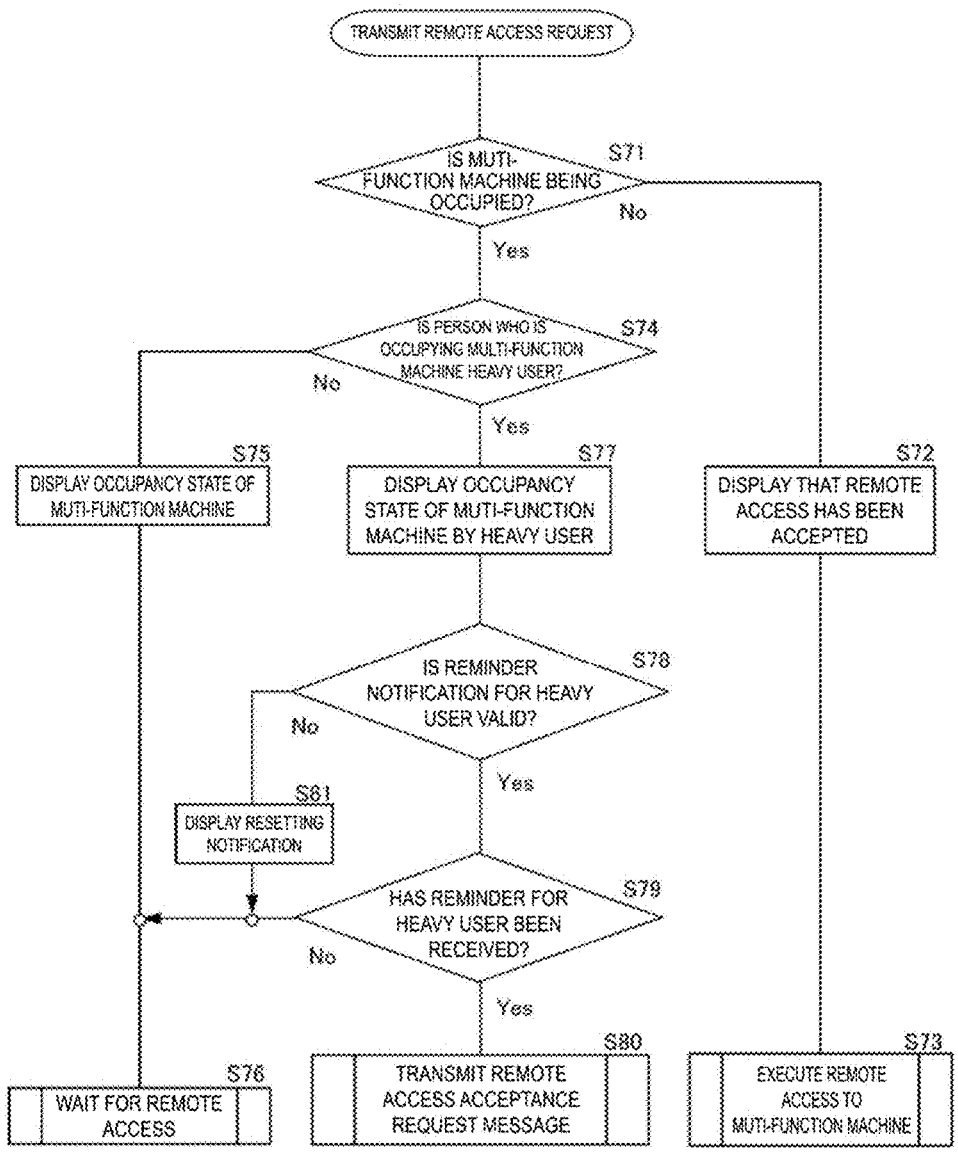
FIG. 17 is a flowchart illustrating processing of transmitting a remote access request to the digital multi-function machine that is executed by the user terminal in the image forming system according to the third embodiment of the disclosure.

FIG. 17 is a flowchart illustrating processing of transmitting a remote access request to the digital multi-function machine 1 that is executed by the user terminal 2 in the image forming system 10 according to the third embodiment of the disclosure.

Since processing in Steps S71 to S77, S79, and S80 in FIG. 17 corresponds to the processing in Steps S11 to S19 in FIG. 7 (first embodiment), respectively, description thereof will be omitted.

Here, processing in Steps S78 and S81 in FIG. 17 that has not been described in FIG. 7 will be described.

In Step S77 in FIG. 17, the display 204 is caused to display that the digital multi-function machine 1 is being occupied by another heavy user in Step S77 in FIG. 17 (Step S77), and the controller 200 of the user terminal 2 then determines whether the reminder notification for the heavy user is valid in the subsequent Step S78 (Step S78).

In a case where the reminder notification for the heavy user is valid (in a case of Yes in the determination in Step S78), the controller 200 determines whether the reminder for the heavy user has been received in Step S79 (Step S79).

On the other hand, in a case where the reminder notification for the heavy user is not valid (in a case of No in the determination in Step S78), the controller 200 causes the display 204 to display a resetting notification in Step S81 (Step S81).

Figure 18:
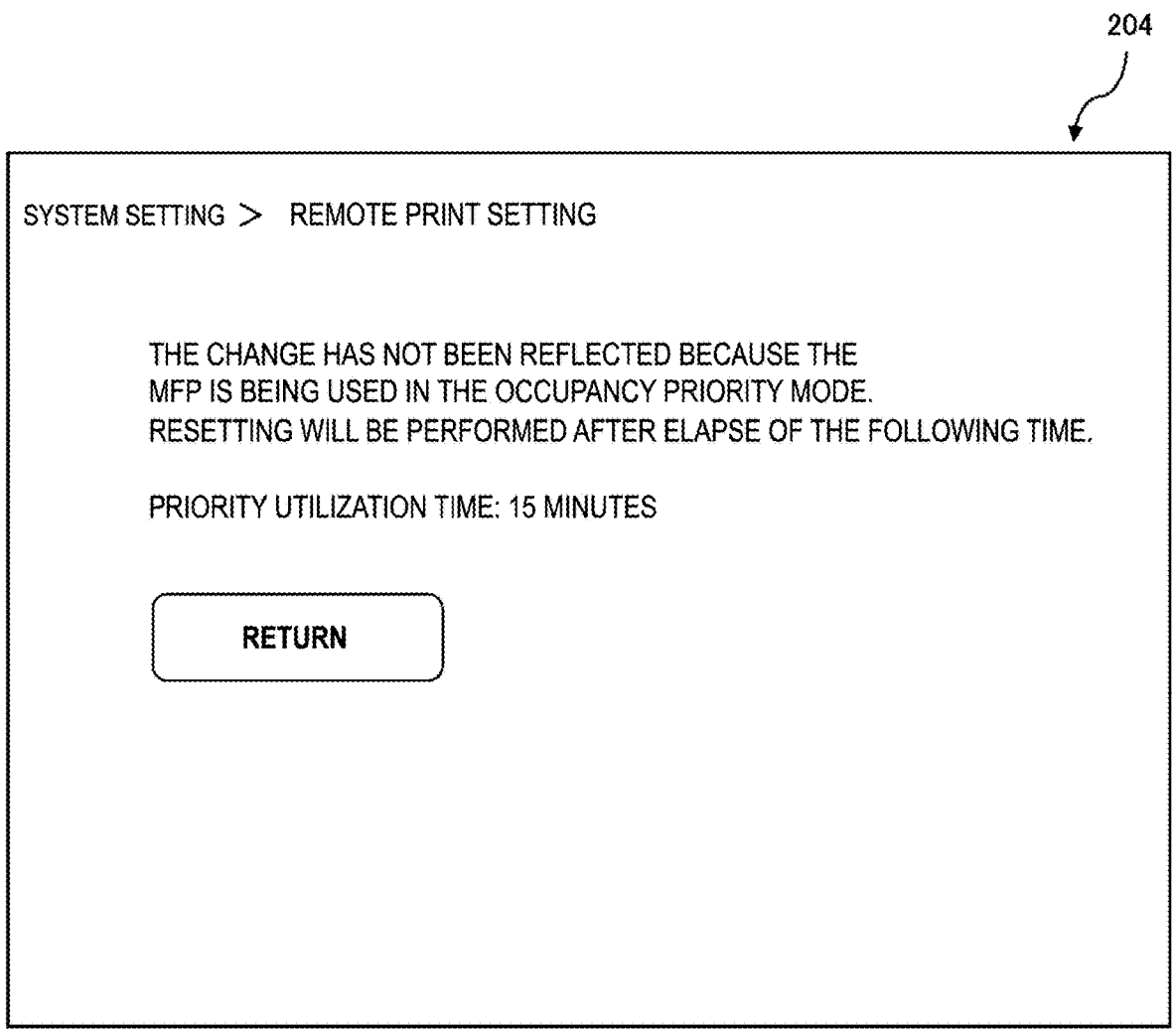
FIG. 18 is an example of a message that is displayed on the user terminal and indicates that the digital multi-function machine is being occupied in an occupancy priority mode in the image forming system according to the third embodiment of the disclosure.

FIG. 18 is an example of a message that is displayed on the user terminal 2 and indicates that the digital multi-function machine 1 is being occupied in an occupancy priority mode in the image forming system 10 according to the third embodiment of the disclosure.

In the example in FIG. 18, a "Back" button is displayed along with the message "The change has not been reflected because the MFP is being used in the occupancy mode. Resetting will be performed after the following time elapses. Priority utilization time: 15 minutes".

In this manner, it is possible to realize the highly user-friendly image forming system 10 by displaying a message based on a reminder in a case where the digital multi-function machine 1 is being occupied by a heavy user and only when the reminder notification for the heavy user is valid, and avoiding unnecessary occupancy of the digital multi-function machine 1 by the users as compared to the related art to reduce waiting times for the remote users.

Fourth Embodiment

Processing at Time of Remote Access to Digital Multi-Function Machine 1 in Image Forming System 10 According to Fourth Embodiment of Disclosure Next, processing at the time of a remote access to a digital multi-function machine 1 in an image forming system 10 according to a fourth embodiment of the disclosure will be described based on FIG. 19 and FIG. 20.

In the fourth embodiment, a case in which virtual network computing (VNC) that displays a screen of the digital multi-function machine 1 on the display 204 of the user terminal 2 through the network 3 and remotely operates the screen has accessed the digital multi-function machine 1 is assumed.

Since a schematic configuration of the image forming system 10 according to the fourth embodiment of the disclosure is the same as that in the first embodiment (FIG. 1 to FIG. 3), description thereof will be omitted.

Also, since processing of receiving/transmitting a remote access from the VNC to the digital multi-function machine is similar to that in the second embodiment (FIG. 11 and FIG. 13), description will be omitted.

Figure 19:
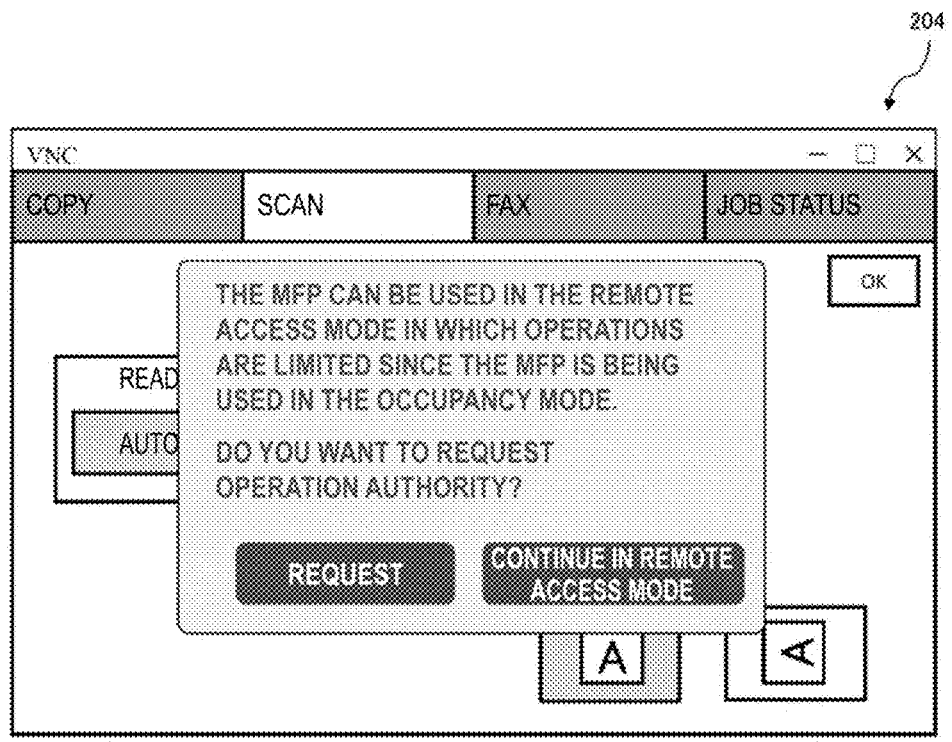
FIG. 19 is an example of a message that is displayed on a user terminal and indicates that a digital multi-function machine is being occupied at the time of an access from VNC in an image forming system according to a fourth embodiment of the disclosure.

FIG. 19 is an example of a message that is displayed on the user terminal 2 and indicates that the digital multi-function machine 1 is being occupied at the time of an access from the VNC in the image forming system 10 according to the fourth embodiment of the disclosure.

In the example in FIG. 19, "Request" and "Continue in remote access mode" buttons are displayed along with the message "The MFP can be used in a remote access mode in which operations are limited since the MPF is being used in the occupancy mode. Do you want to request operation authority?".

In this manner, in the case where the digital multi-function machine 1 is being occupied at the time of the access from the VNC, a dialog indicating that the operation is limited is displayed for the remote user.

Figure 20:
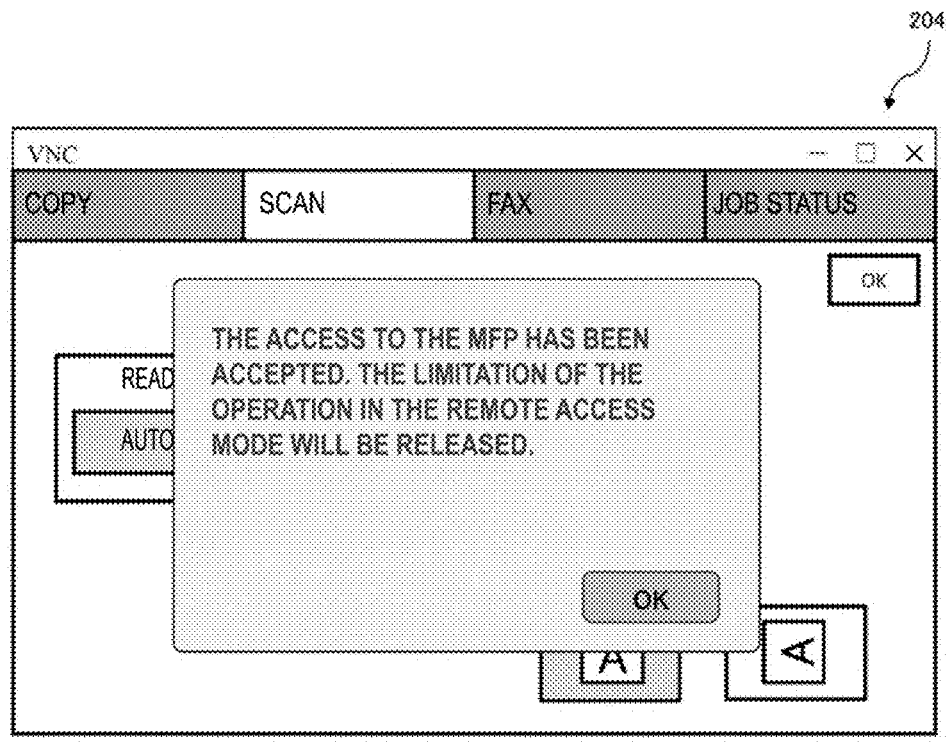
FIG. 20 is an example of a message that is displayed on the user terminal and indicates that an access from the user terminal to the digital multi-function machine has been accepted in the image forming system according to the fourth embodiment of the disclosure.

FIG. 20 is an example of a message that is displayed on the user terminal 2 and indicates that the access to the digital multi-function machine 1 by the user terminal 2 has been accepted in the image forming system 10 according to the fourth embodiment of the disclosure.

In the example in FIG. 20, an "OK" button is displayed along with the message "The access to the MFP has been accepted. The limitation of the operations in the remote access mode will be released."

Figure 21:
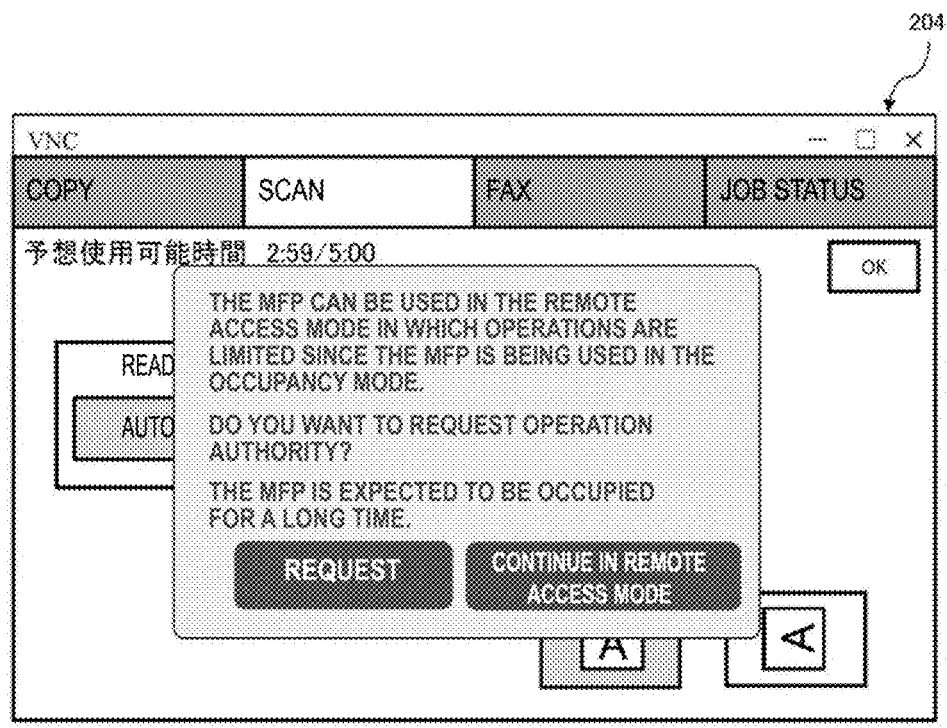
FIG. 21 is an example of a message that is displayed on the user terminal and indicates that the digital multi-function machine is being occupied by a heavy user at the time of an access from the VNC in the image forming system according to the fourth embodiment of the disclosure.

FIG. 21 is an example of a message that is displayed on the user terminal 2 and indicates that the digital multi-function machine 1 is being occupied by a heavy user at the time of the access from the VNC in the image forming system 10 according to the fourth embodiment of the disclosure.

In the example in FIG. 21, "Request" and "Continue in remote access mode" buttons are displayed along with the message "The MFP can be used in the remote access mode in which operations are limited since the MFP is being used in the occupancy mode. Do you want to request operation authority? Occupancy of the MFP for a long time is expected."

"Expected utilization available time 2:59/5:00" is displayed in the upper bar on the screen.

In this manner, it is possible to realize the highly user-friendly image forming system 10 by providing a notification that the operations are limited and receiving a request for releasing the limitation of the operation in a case where the digital multi-function machine 1 is being occupied by a heavy user at the time of the access from the VNC, and avoiding unnecessary occupancy of the digital multi-function machine 1 by the users as compared with that in the related art to reduce waiting times for the remote users.

Fifth Embodiment

Processing When Using Digital Multi-Function Machine Is No Longer Possible at Time of Remote Access to Digital Multi-Function Machine 1 in Image Forming System 10 According to Fifth Embodiment of Disclosure Next, processing in a case where it is no longer possible to use a digital multi-function machine at the time of a remote access to a digital multi-function machine 1 due to occurrence of an error in an image forming system 10 according to a fifth embodiment of the disclosure will be described based on FIG. 22 to FIG. 25.

Figure 22:
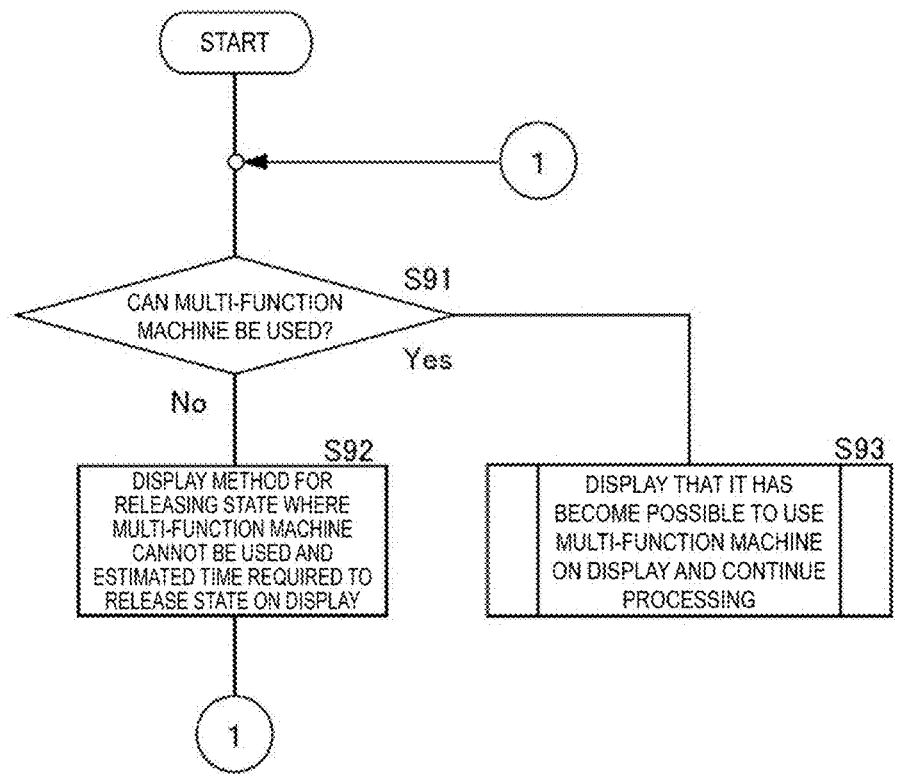
FIG. 22 is a flowchart illustrating processing of a digital multi-function machine in a case where the digital multi-function machine cannot be used, in an image forming system according to a fifth embodiment of the disclosure.

FIG. 22 is a flowchart illustrating processing of the digital multi-function machine 1 in a case where it is no longer possible to use the digital multi-function machine 1 in the image forming system 10 according to the fifth embodiment of the disclosure.

In Step S91 in FIG. 22, the controller 100 of the digital multi-function machine 1 determines whether the digital multi-function machine 1 can be used (Step S91).

In a case where the digital multi-function machine 1 cannot be used (in a case of No in the determination in Step S91), the controller 100 causes a display 1071 to display a method for releasing the state where the digital multi-function machine 1 cannot be used and an estimated time required to release the state in Step S92 (Step S92).

Here, examples of the case where the digital multi-function machine 1 cannot be used include a case where an error such as a paper jam, being out of paper, shortage of toner, a contact failure of a drum unit, or the like has occurred.

Also, as the estimated time required to release the state, an estimated time required to release the state is set in accordance with a type of an error, such as five minutes for paper jam or two minutes for toner exchange.

Figure 23:
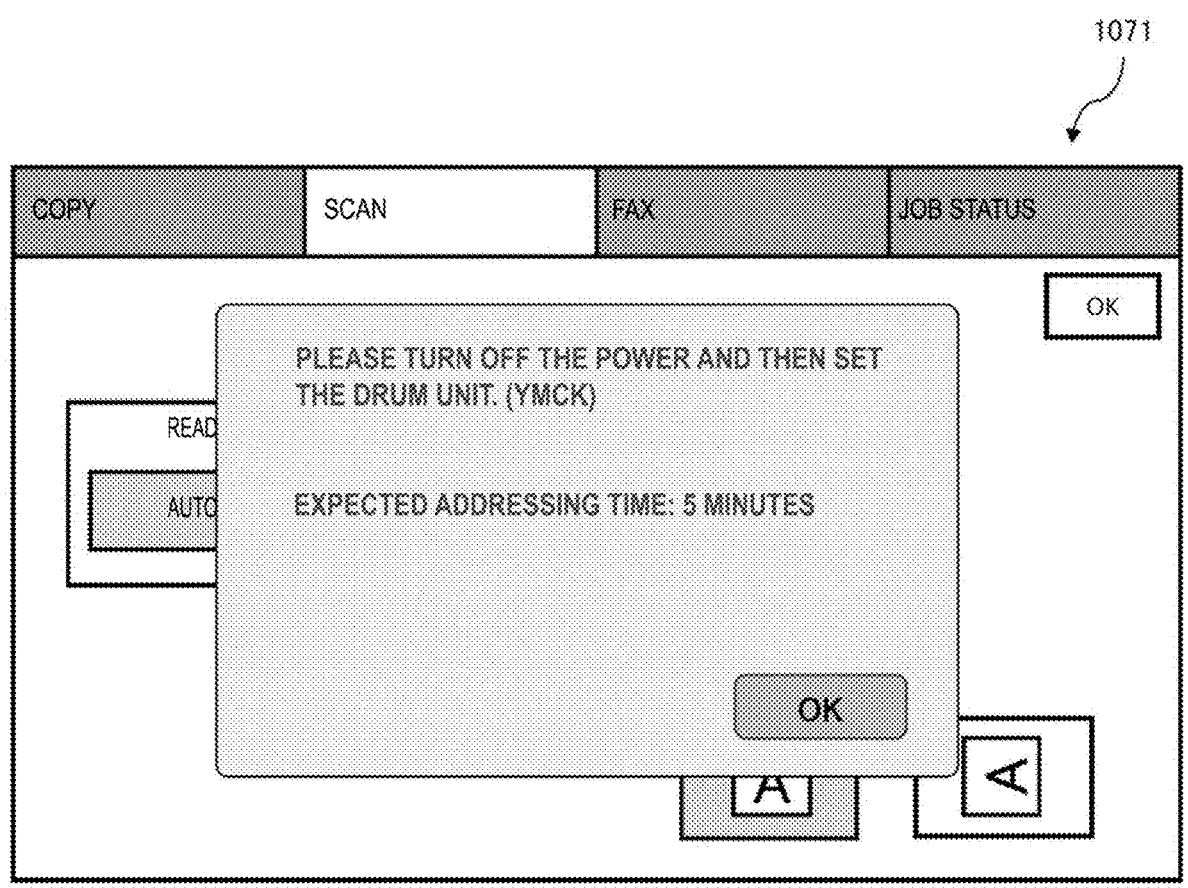
FIG. 23 is an example of a message that is displayed on the digital multi-function machine and indicates a release method in the case where the digital multi-function machine cannot be used, in the image forming system according to the fifth embodiment of the disclosure.

FIG. 23 is an example of a message that is displayed on the digital multi-function machine 1 and indicates a releasing method in a case where it becomes impossible to use the digital multi-function machine 1 in the image forming system 10 according to the fifth embodiment of the disclosure.

FIG. 23 assumes a message that is to be displayed on the display 1071 in a case where the printing function of the digital multi-function machine 1 has stopped due to a contact failure of the drum unit. In the example in FIG. 23, an "OK" button is displayed along with the message "Please turn off the power and then set the drum unit. (YMCK) estimated addressing time: five minutes".

Note that in a case where the digital multi-function machine 1 is not being occupied, the above message need not be displayed.

Subsequently, the controller 100 returns the processing to the determination in Step S91.

In a case where it becomes possible to use the digital multi-function machine 1 in Step S91 (in a case of Yes in the determination in Step S91), the controller 100 continues the processing of the digital multi-function machine 1 in Step S93 (Step S93).

Figure 24:
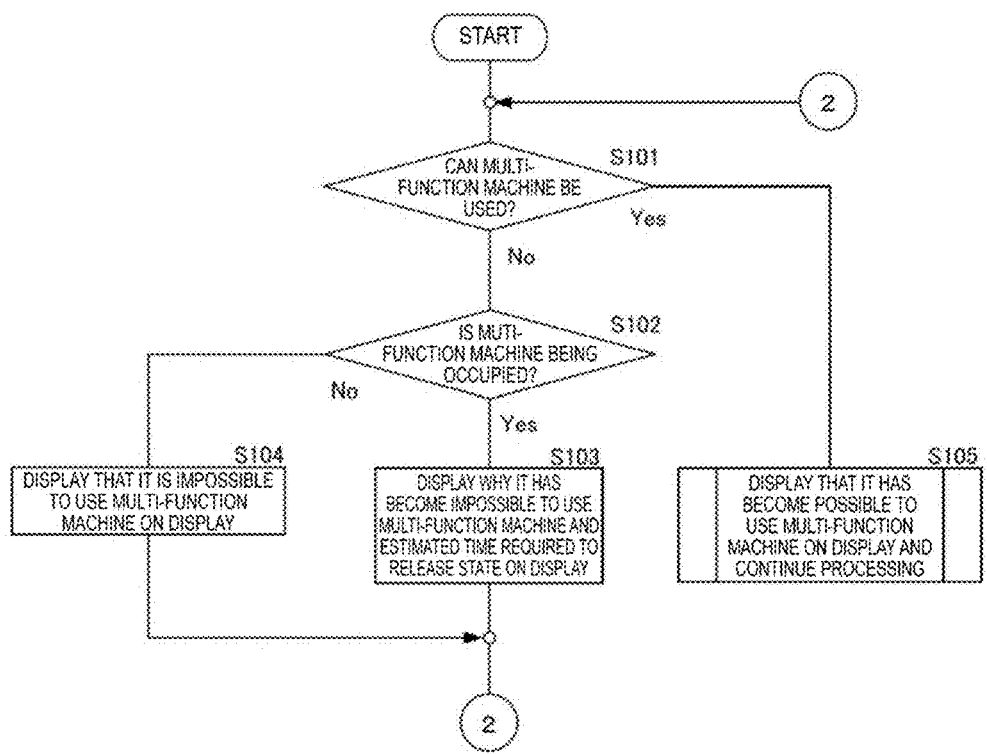
FIG. 24 is a flowchart illustrating processing of the user terminal in the case where the digital multi-function machine cannot be used, in the image forming system according to the fifth embodiment of the disclosure.

FIG. 24 is a flowchart illustrating processing of the user terminal 2 in a case where it is no longer possible to use the digital multi-function machine 1 in the image forming system 10 according to the fifth embodiment of the disclosure.

In Step S101 in FIG. 24, the controller 200 of the user terminal 2 determines whether the digital multi-function machine can be used (Step S101).

In a case where it is not possible to use the digital multi-function machine 1 (in a case of No in the determination in Step S101), the controller 200 determines whether the digital multi-function machine 1 is being occupied in Step S102 (Step S102).

In a case where the digital multi-function machine 1 is being occupied (in a case of Yes in the determination in Step S102), the controller 200 causes the display 204 to display why the digital multi-function machine 1 cannot be used and an estimated time required to release the state in Step S103 (Step S103).

The estimated time required to release the state where the digital multi-function machine 1 cannot be used is calculated on the assumption of an estimated time in a case where the user who is occupying the digital multi-function machine 1 executes a releasing task.

Figure 25:
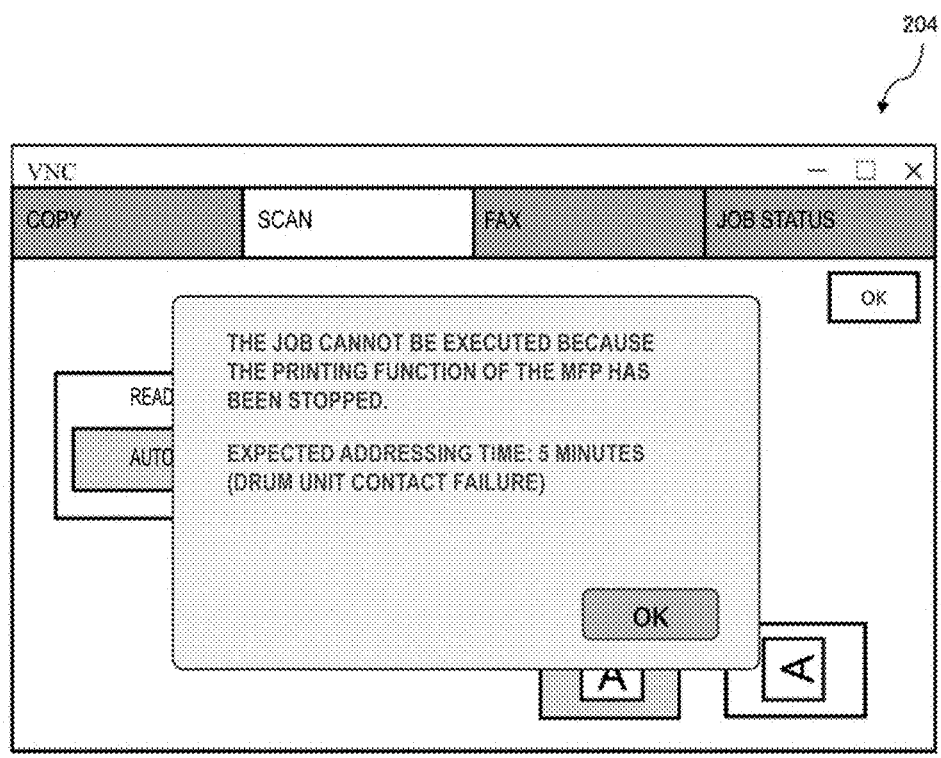
FIG. 25 is an example of a message that is displayed on the user terminal and indicates the fact that the digital multi-function machine cannot be used and the reason therefor, in the image forming system according to the fifth embodiment of the disclosure.

FIG. 25 is an example of a message that is displayed on the user terminal 2 and indicates the fact that it is no longer possible to use the digital multi-function machine 1 and the reason therefor, in the image forming system 10 according to the fifth embodiment of the disclosure.

FIG. 25 assumes a message to be displayed on the display 1071 in a case where the printing function of the digital multi-function machine 1 has stopped due to a contact failure of the drum unit.

In the example in FIG. 25, an "OK" button is displayed along with the message "The job cannot be executed because the printing function of the MFP has been stopped. Expected addressing time: five minutes (drum unit contact failure)".

On the other hand, in a case where the digital multi-function machine 1 is not being occupied (in a case of No in the determination in Step S102), the controller 200 causes the display 204 to display that the digital multi-function machine 1 cannot be used in Step S104 (Step S104).

Subsequently, the controller 200 returns the processing to the determination in Step S101.

In a case where it becomes possible to use the digital multi-function machine 1 in Step S101 (in a case of Yes in the determination in Step S101), the controller 200 continues the processing of the user terminal 2 in Step S105 (Step S105).

In a case where there is no user who is occupying the digital multi-function machine 1, when the task of releasing the state where the digital multi-function machine 1 cannot be used will be executed is not known, and the remote user is thus notified only of the fact that the digital multi-function machine 1 cannot be used.

In this manner, it is possible to realize the highly user-friendly image forming system 10 by displaying that the digital multi-function machine 1 cannot be used and displaying an estimated time required to release the state in a case where the digital multi-function machine 1 cannot be used.

Preferred aspects of the disclosure include combinations of any of the multiple aspects described above.

In addition to the embodiments described above, various modifications may be made regarding the disclosure. It should not be understood that those modifications do not belong to the scope of the disclosure. The disclosure shall include meanings equivalent to the scope of Claims and all modifications within the scope.

REFERENCE SIGNS LIST

1: Digital multi-function machine, 2, 2A, 2B, 2C, 2D: User terminal, 3: Network, 10: Image forming system, 100, 200: Controller, 101: Image data acquirer, 102: Image former, 103, 201: Storage, 104, 202: Image processor, 105, 203: Communicator, 106: Timer, 107: Operation panel, 108: Sheet feeder, 109: User authenticator, 204, 1071: Display, 205, 1072: Operation inputter

The invention claimed is:

1. An image forming device comprising:
    a communicator that receives a remote access request from a user terminal via a network;
    an image former that forms an image based on image data;
    a storage that holds a utilization history of each user; and
    a controller that controls the communicator, the image former, and the storage,
    wherein when the communicator receives the remote access request from the user terminal, the controller
        determines whether the image forming device is used by a second user that is different from a first user having sent the remote access request,
        determines whether a utilization time of the image forming device per use by the second user has exceeded a predetermined threshold value based on the utilization history of the second user when the image forming device is determined to be used by the second user, and
        notifies the user terminal, via the communicator, that the utilization time of the image forming device per use by the second user has exceeded the threshold value when the utilization time of the image forming device per use by the second user is determined to exceed the threshold value.

2. The image forming device according to claim 1, wherein the controller further calculates an expected utilization time of the second user based on the utilization history of the second user and an operation status of the image former, and notifies the user terminal, via the communicator, of the expected utilization time when the image forming device is determined to be used by the second user.

3. The image forming device according to claim 2, further comprising:
    a display that displays various types of information to the user,
    wherein the controller further causes the display to display a warning message to the second user when the utilization time of the image forming device per use by the second user exceeds the expected utilization time.

4. The image forming device according to claim 1, further comprising:
    a display that displays various types of information to the user,
    wherein the controller further causes the display, in a case that the image forming device is determined to be used by the second user and the utilization time of the image forming device has exceeded the predetermined threshold value, to display a message indicating that the communicator has received a reminder notification for the second user from the user terminal when the communicator has received the reminder notification for the second user from the user terminal.

5. A method for providing a notification regarding a utilization status of an image forming device, the method comprising:
    receiving a remote access request from a user terminal via a network;
    forming an image based on image data; and
    holding a utilization history of each user,
    wherein when the remote access request is received from the user terminal, the method further comprises:
        determining whether the image forming device is used by a second user that is different from a first user having sent the remote access request;
        determining whether a utilization time of the image forming device per use by the second user has exceeded a predetermined threshold value based on the utilization history of the second user when the image forming device is determined to be used by the second user; and
        notifying the user terminal that the utilization time of the image forming device per use by the second user has exceeded the threshold value when the utilization time of the image forming device per use by the second user is determined to exceed the threshold value.

6. A user terminal comprising:
    a communicator that transmits a remote access request to an image forming device via a network;
    an operation inputter that receives the remote access request and an instruction for the image forming device;
    a display that displays various types of information to a user; and
    a controller that controls the communicator, the operation inputter, and the display,
    wherein when the operation inputter receives the remote access request to the image forming device, the controller
        inquires, via the communicator, whether the image forming device is used by another user that is different from the user,
        determines whether a utilization time of the image forming device per use by the other user has exceeded a predetermined threshold value based on a utilization history of the other user when a response is obtained indicating that the image forming device is used by the other user, and
        displays, on the display, a message indicating that the utilization time of the image forming device per use by the other user has exceeded the predetermined threshold value when the utilization time of the image forming device per use by the other user is determined to exceed the predetermined threshold value.

* * * * *